United States Patent
Yasu

(10) Patent No.: US 11,327,594 B2
(45) Date of Patent: May 10, 2022

(54) FORCE SENSE PRESENTING OBJECT AND FORCE SENSE PRESENTING METHOD

(71) Applicant: NIPPON TELEGRAPH AND TELEPHONE CORPORATION, Chiyoda-ku (JP)

(72) Inventor: Kentaro Yasu, Atsugi (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 447 days.

(21) Appl. No.: 16/490,329

(22) PCT Filed: Feb. 26, 2018

(86) PCT No.: PCT/JP2018/008192
§ 371 (c)(1),
(2) Date: Aug. 30, 2019

(87) PCT Pub. No.: WO2018/159854
PCT Pub. Date: Sep. 7, 2018

(65) Prior Publication Data
US 2021/0405842 A1    Dec. 30, 2021

(30) Foreign Application Priority Data

Mar. 3, 2017  (JP) .............................. JP2017-040126
Oct. 6, 2017  (JP) .............................. JP2017-195927

(51) Int. Cl.
*G06F 3/041*   (2006.01)
*G06F 3/0488*  (2022.01)
(Continued)

(52) U.S. Cl.
CPC .......... *G06F 3/04144* (2019.05); *G01L 1/122* (2013.01); *G06F 3/016* (2013.01);
(Continued)

(58) Field of Classification Search
None
See application file for complete search history.

(56) References Cited

U.S. PATENT DOCUMENTS 7,737,945 B2 *  6/2010  West .................. G06F 3/03548
                                                   345/157
2008/0024464 A1 *  1/2008  West .................. G06F 3/03548
                                                   345/184
(Continued)

FOREIGN PATENT DOCUMENTS

JP   2000-89895 A    3/2000
JP   2000-207114 A   7/2000
(Continued)

OTHER PUBLICATIONS

International Search Report dated Apr. 3, 2018 in PCT/JP2018/008192 filed Feb. 26, 2018.

*Primary Examiner* — Carl Adams
(74) *Attorney, Agent, or Firm* — Oblon, McClelland, Maier & Neustadt, L.L.P.

(57) ABSTRACT

To provide a new force sense presenting technique utilizing illusion. A force sense presenting object includes: a first object that includes a first surface which is magnetized with a first texture including an S-pole region and an N-pole region; and a second object that includes a second surface which is magnetized with a second texture including an S-pole region and an N-pole region. An acting subject touches at least either one of the first object and the second object and performs an operation for changing a relative positional relation between the first surface and the second surface or/and an action for changing the relative positional relation between the first surface and the second surface while keeping the first surface and the second surface in contact with or close to each other, and thereby the acting subject perceives bumpiness.

7 Claims, 29 Drawing Sheets

(51) Int. Cl.
*G06F 3/01* (2006.01)
*G01L 1/12* (2006.01)
*G06F 3/0354* (2013.01)

(52) U.S. Cl.
CPC ........ *G06F 3/03547* (2013.01); *G06F 3/0488* (2013.01); *G06F 2203/04104* (2013.01)

(56) References Cited

U.S. PATENT DOCUMENTS

| | | |
|---|---|---|
| 2008/0129705 A1 | 6/2008 | Kim et al. |
| 2011/0296975 A1* | 12/2011 | de Jong ............... G10H 1/0555 84/725 |
| 2019/0105562 A1* | 4/2019 | Grant .................... A63F 13/211 |
| 2019/0377412 A1* | 12/2019 | Parastegari ........... A63F 13/285 |
| 2020/0211418 A1* | 7/2020 | Greiner .................. G09F 9/375 |

FOREIGN PATENT DOCUMENTS

| | | | |
|---|---|---|---|
| JP | 2001-187155 A | 7/2001 | |
| JP | 2002-41208 A | 2/2002 | |
| JP | 2008-146649 A | 6/2008 | |
| WO | WO-2018159856 A1 * | 9/2018 | ............. G06F 3/016 |

\* cited by examiner

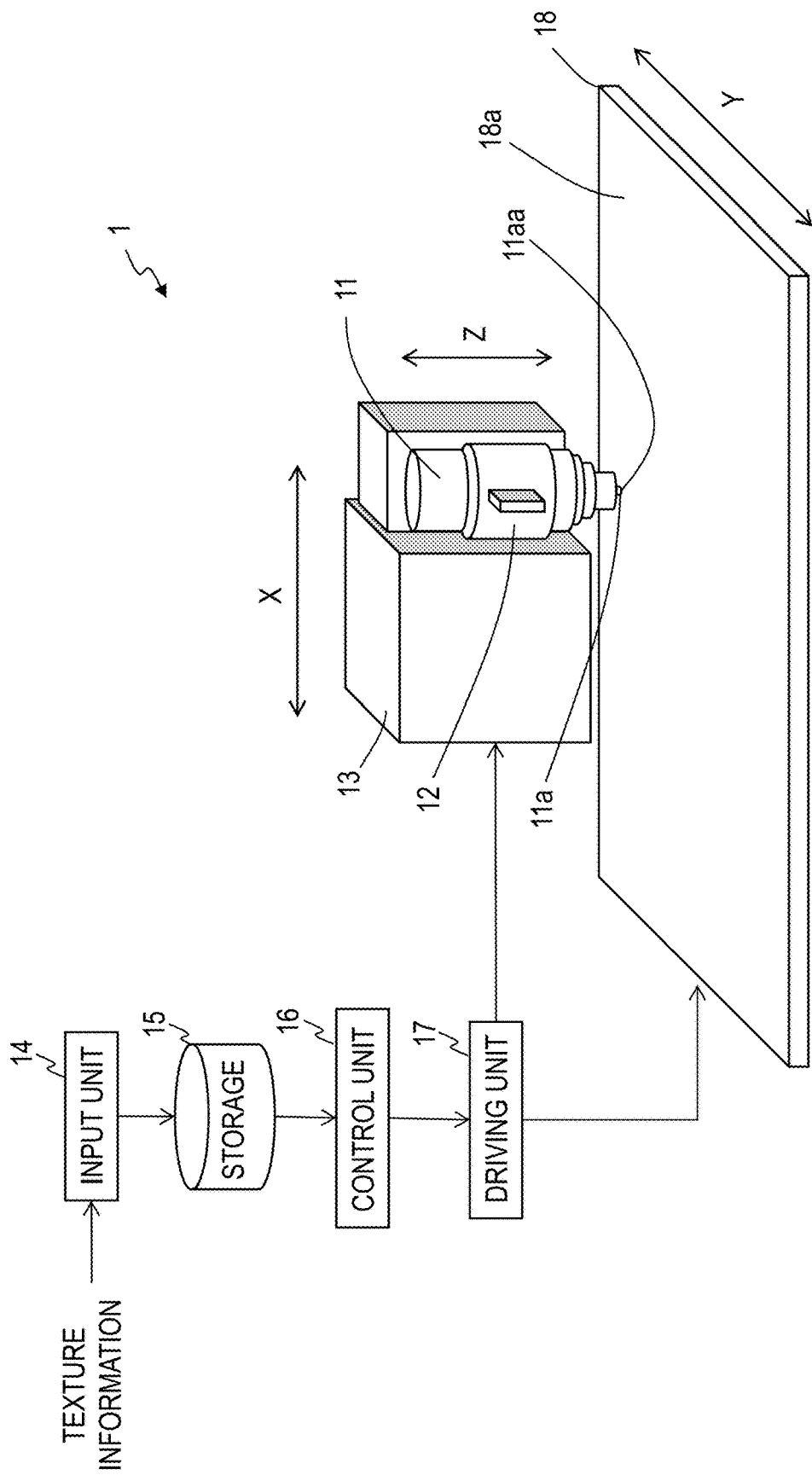

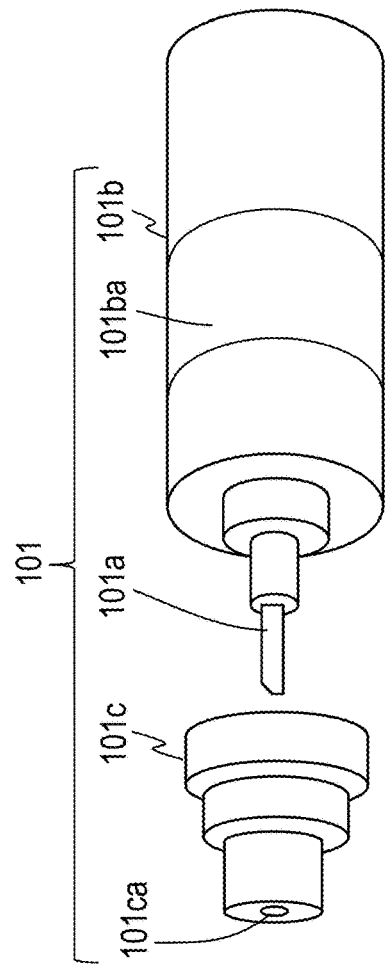
FIG. 3A
FIG. 3B
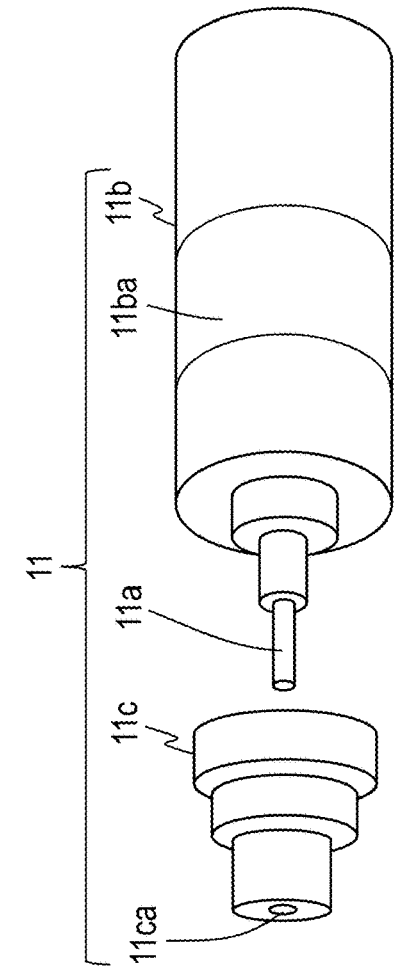
FIG. 3C
FIG. 3D

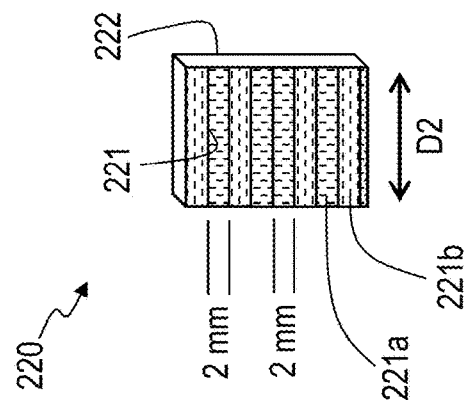
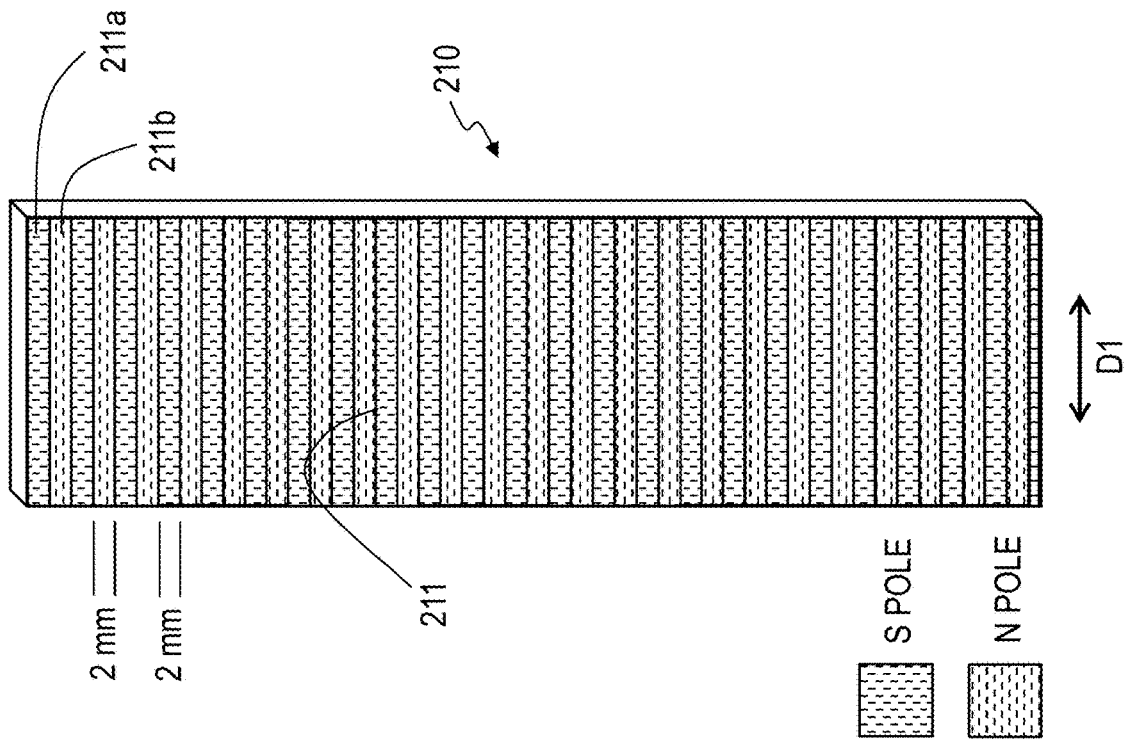

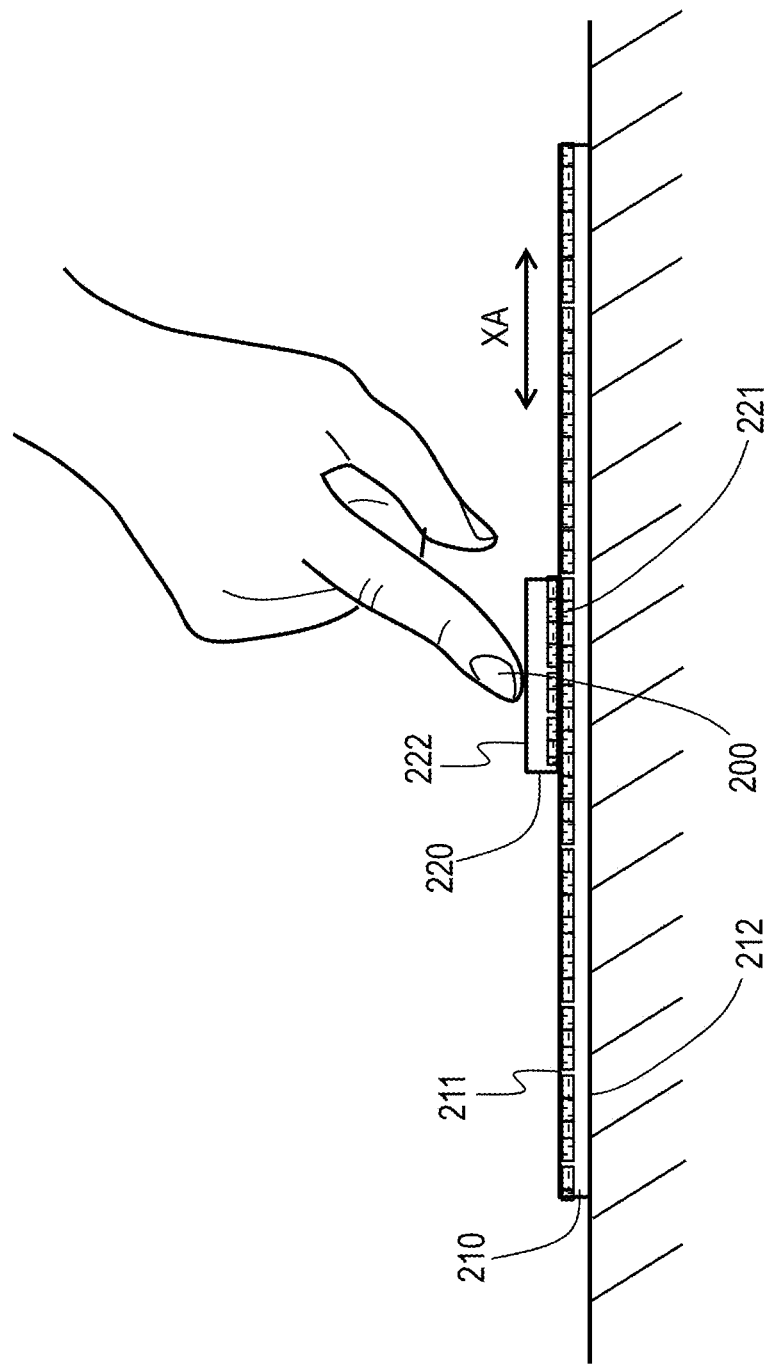

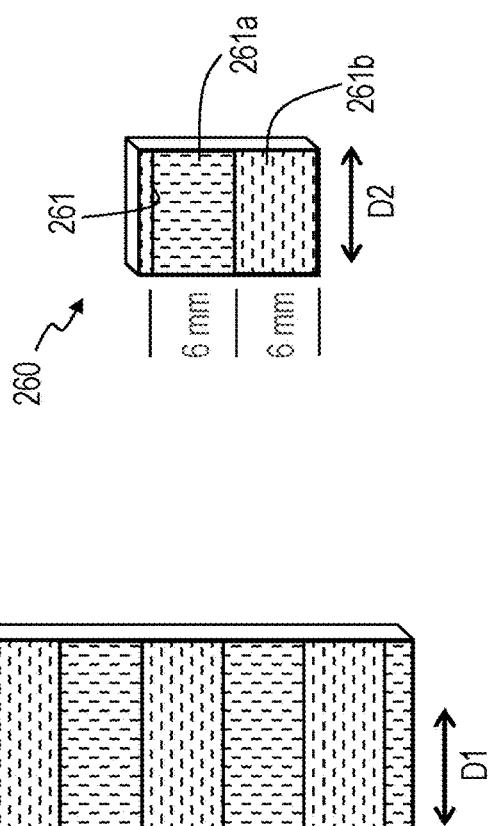
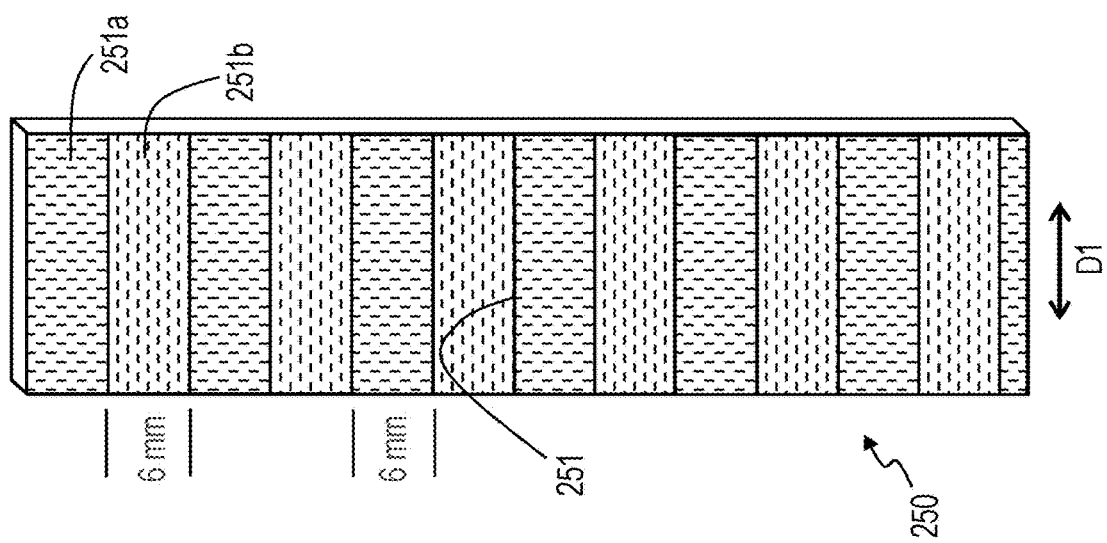
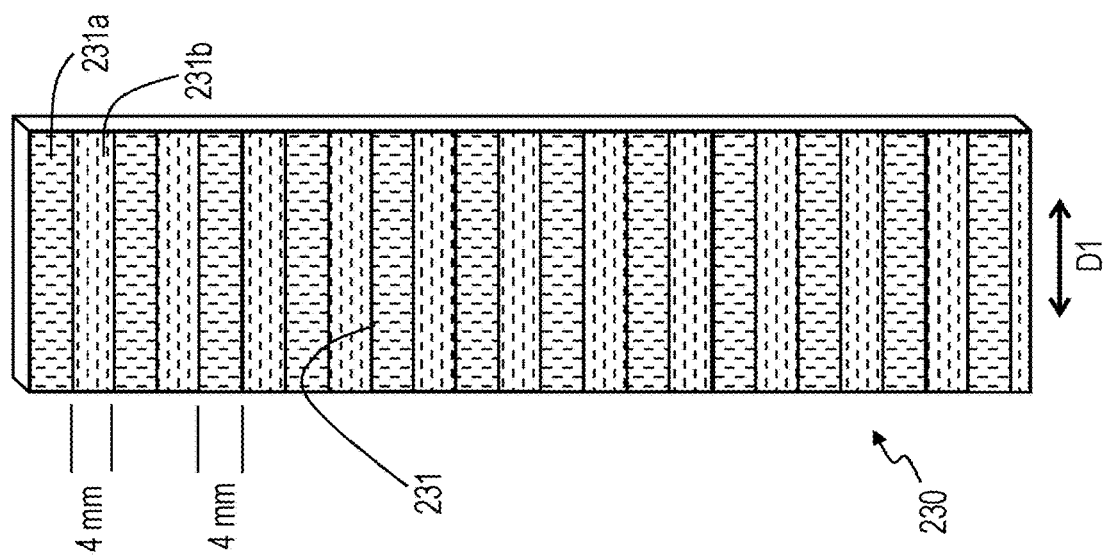

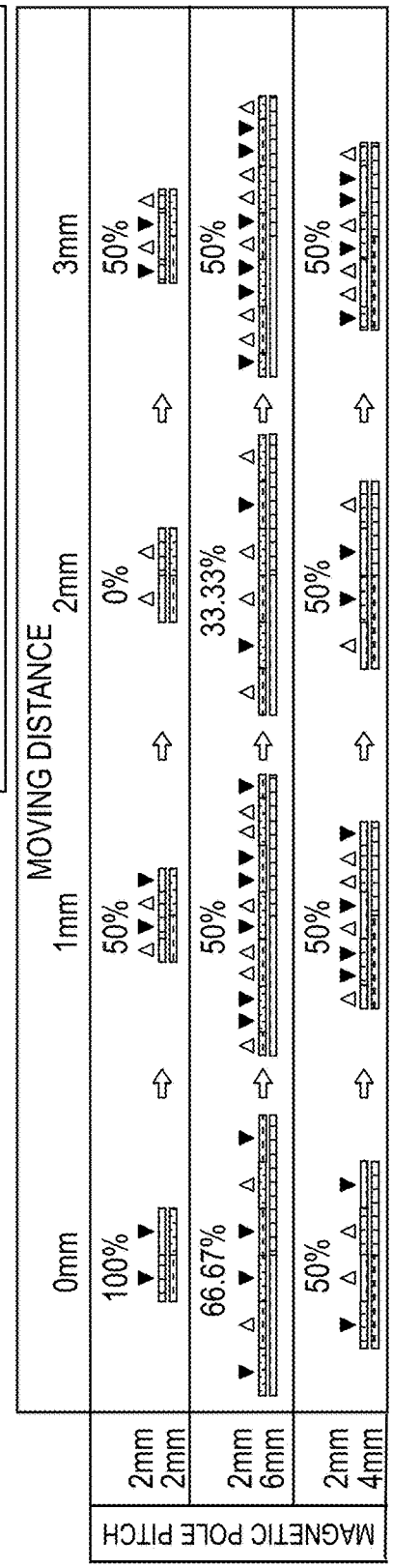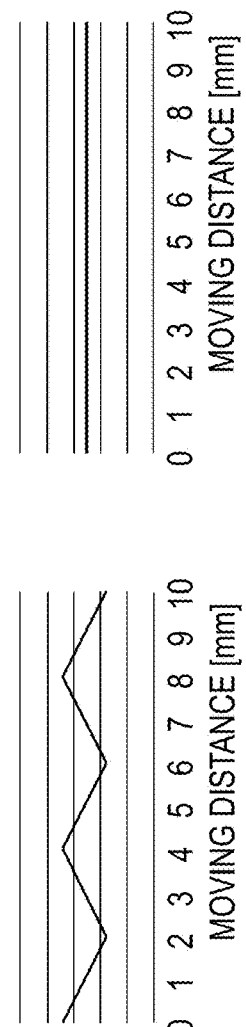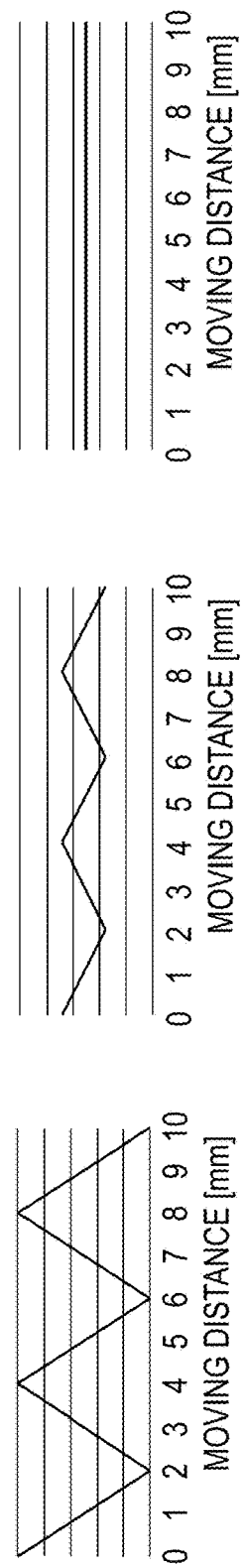

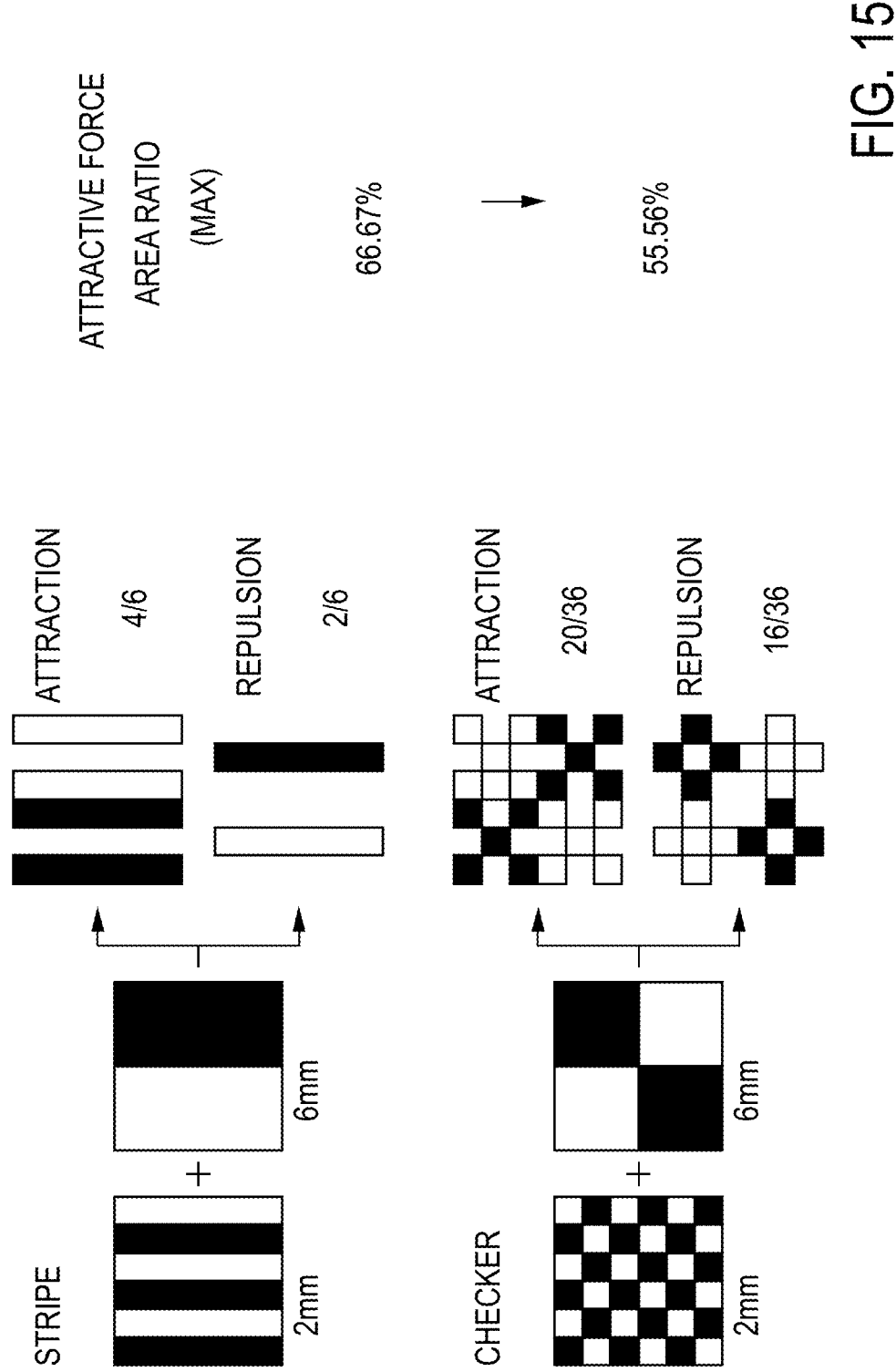

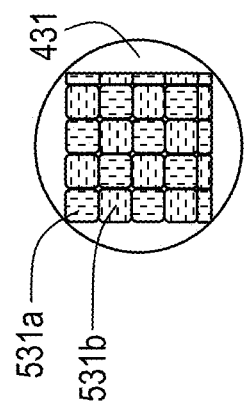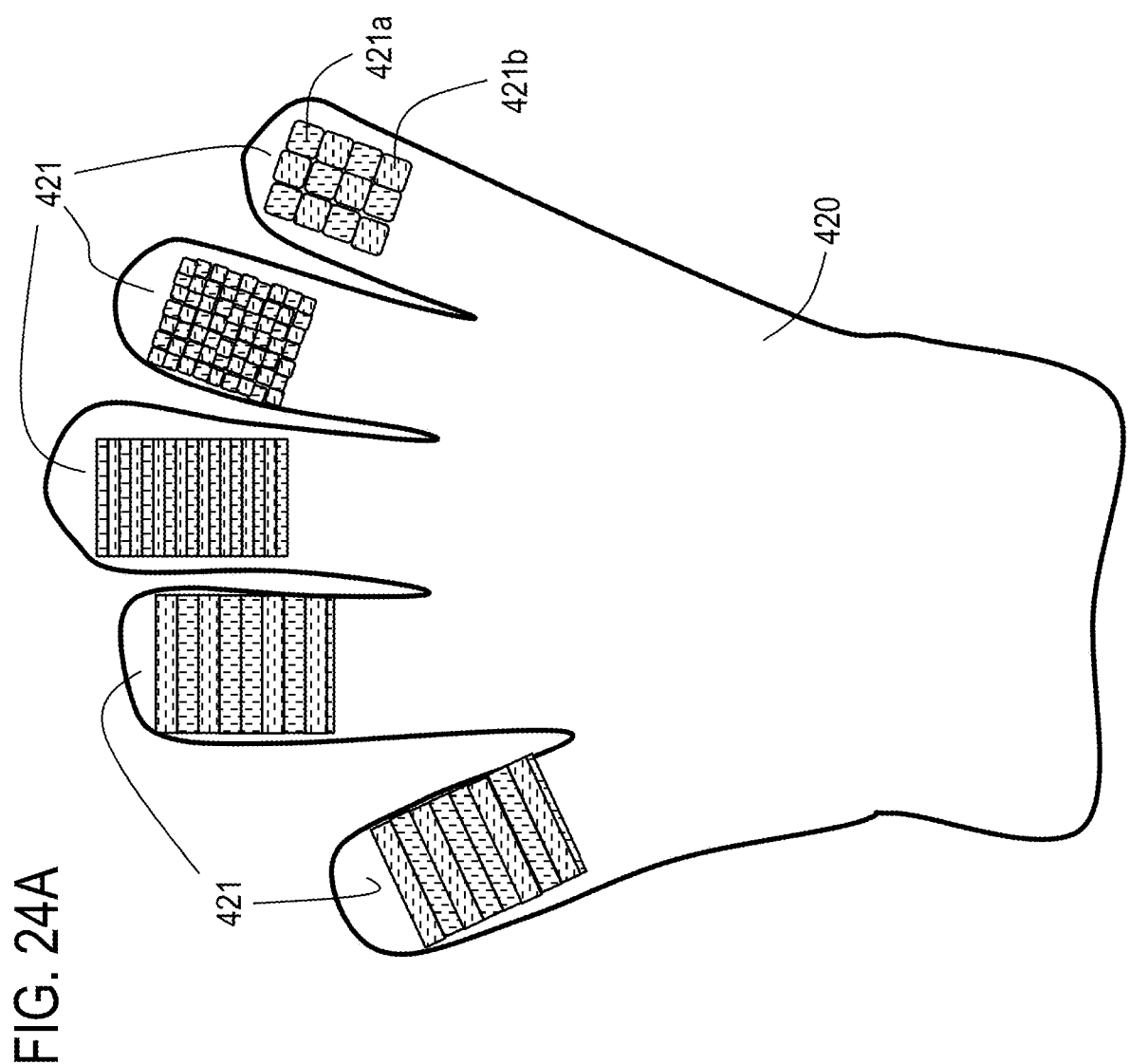

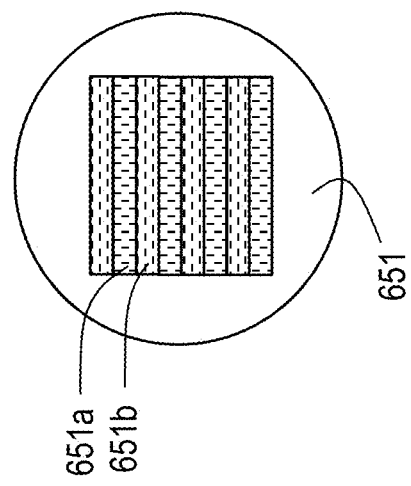
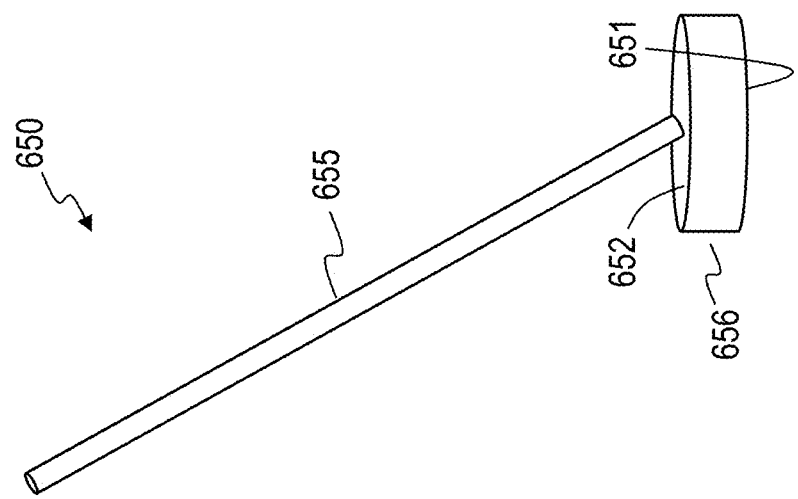
FIG. 29B
FIG. 29A

FORCE SENSE PRESENTING OBJECT AND FORCE SENSE PRESENTING METHOD

TECHNICAL FIELD

The present invention relates to techniques for presenting a force sense.

BACKGROUND ART

Patent Literature 1 discloses the technique for presenting a force sense of an object such as bumpy feeling which is obtained when a person touches the object with his/her fingers. Patent Literature 2 discloses the technique for feeding back a force sense to an operator of a drawing tablet.

PRIOR ART LITERATURE

Patent Literature

Patent Literature 1: Japanese Patent Application Laid Open No. 2000-89895
Patent Literature 2: Japanese Patent Application Laid Open No. 2000-207114

SUMMARY OF THE INVENTION

Problems to be Solved by the Invention

The present invention provides a new force sense presenting technique utilizing illusion.

Means to Solve the Problems

A force sense presenting object according to the present invention includes: a first object that includes a first surface which is magnetized with a first texture including an S-pole region and an N-pole region; and a second object that includes a second surface which is magnetized with a second texture including an S-pole region and an N-pole region. An acting subject touches at least either one of the first object and the second object and performs an operation for changing a relative positional relation between the first surface and the second surface or/and an action for changing the relative positional relation between the first surface and the second surface while keeping the first surface and the second surface in contact with or close to each other, and thereby the acting subject perceives bumpiness.

Effects of the Invention

According to the present invention, bumpy feeling can be perceived based on illusion.

BRIEF DESCRIPTION OF THE DRAWINGS

FIG. 1 is a conceptual diagram illustrating a functional configuration of a magnetization device according to an embodiment.
FIG. 3A is a perspective view illustrating a cutter component of a cutting plotter and FIG. 3B is an exploded perspective view of the cutter component.
FIG. 3C is a perspective view illustrating a magnetization component and FIG. 3D is an exploded perspective view of the magnetization component.
FIG. 6A and FIG. 6B are diagrams illustrating a magnetized magnetic sheet.
FIG. 8 is a diagram illustrating an action for presenting bumpy feeling by two magnetic sheets.
FIG. 9A to FIG. 9D are diagrams illustrating magnetized magnetic sheets.
FIG. 11A to FIG. 11D are diagrams illustrating an attractive force area ratio between two magnetic sheets.
FIG. 15 is a diagram illustrating a difference between an attractive force area ratio of a stripe texture and an attractive force area ratio of a checker texture.
FIG. 24A to FIG. 24C are diagrams illustrating an input device according to the embodiment.
FIG. 29A and FIG. 29B are diagrams illustrating a white cane for magnetic braille paving tiles according to the embodiment.

DETAILED DESCRIPTION OF THE EMBODIMENTS

Embodiments according to the present invention are described below with reference to the accompanying drawings.

First Embodiment

In the present embodiment, a cutter component of a cutting plotter (also referred to as a "cutting machine"), which is an apparatus for making a cut corresponding to inputted texture information on an object based on the inputted texture information, is replaced with a magnetization component and this cutting plotter is driven to magnetize a magnetic sheet (the magnetic sheet is magnetized).

<Configuration>

Figure 2A:
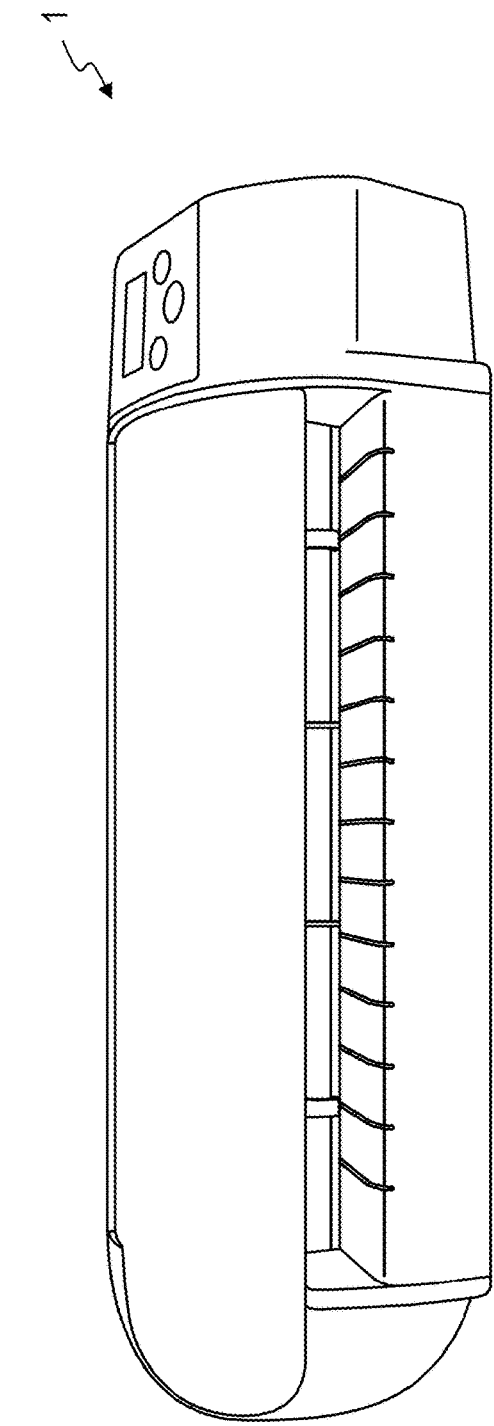
FIG. 2A and FIG. 2B are conceptual diagrams illustrating the functional configuration of the magnetization device according to the embodiment.

As illustrated in FIG. 1 to FIG. 3, a magnetization device 1 according to the present embodiment includes a magnetization component 11, a cutter component attachment unit 12, a drawing head 13, an input unit 14, a storage 15, a control unit 16, and a driving unit 17 and magnetizes a magnetic sheet 18 which is placed. This magnetization device 1 is obtained by replacing a cutter component 101 of a cutting plotter including the cutter component 101, the cutter component attachment unit 12, the drawing head 13, the input unit 14, the storage 15, the control unit 16, and the driving unit 17 with the magnetization component 11.

<<Cutter Component 101 and Magnetization Component 11>>

As illustrated in FIG. 3A and FIG. 3B, the cutter component 101 includes a cutter portion 101a for making a cut on an object, a fixing portion 101b which has a columnar shape and on which the cutter portion 101a is fixed, and a cap portion 101c. One end of the cutter portion 101a is a cutting edge 101aa and the other end is fixed in the fixing portion 101b. The cutter portion 101a may be attachable to and detachable from the fixing portion 101b or does not have to be attachable and detachable. A through hole 101ca is formed on an end side of the cap portion 101c. The cap portion 101c can be attached to the cutter portion 101a side of the fixing portion 101b. When the cap portion 101c is attached to the cutter portion 101a side of the fixing portion 101b, the cutting edge 101aa protrudes to the outside of the cap portion 101c through the through hole 101ca. An attachment region 101ba is provided on an outer lateral surface of the fixing portion 101b and this attachment region 101ba can be fixed on an attachment position of the above-mentioned cutting plotter.

Figure 4:
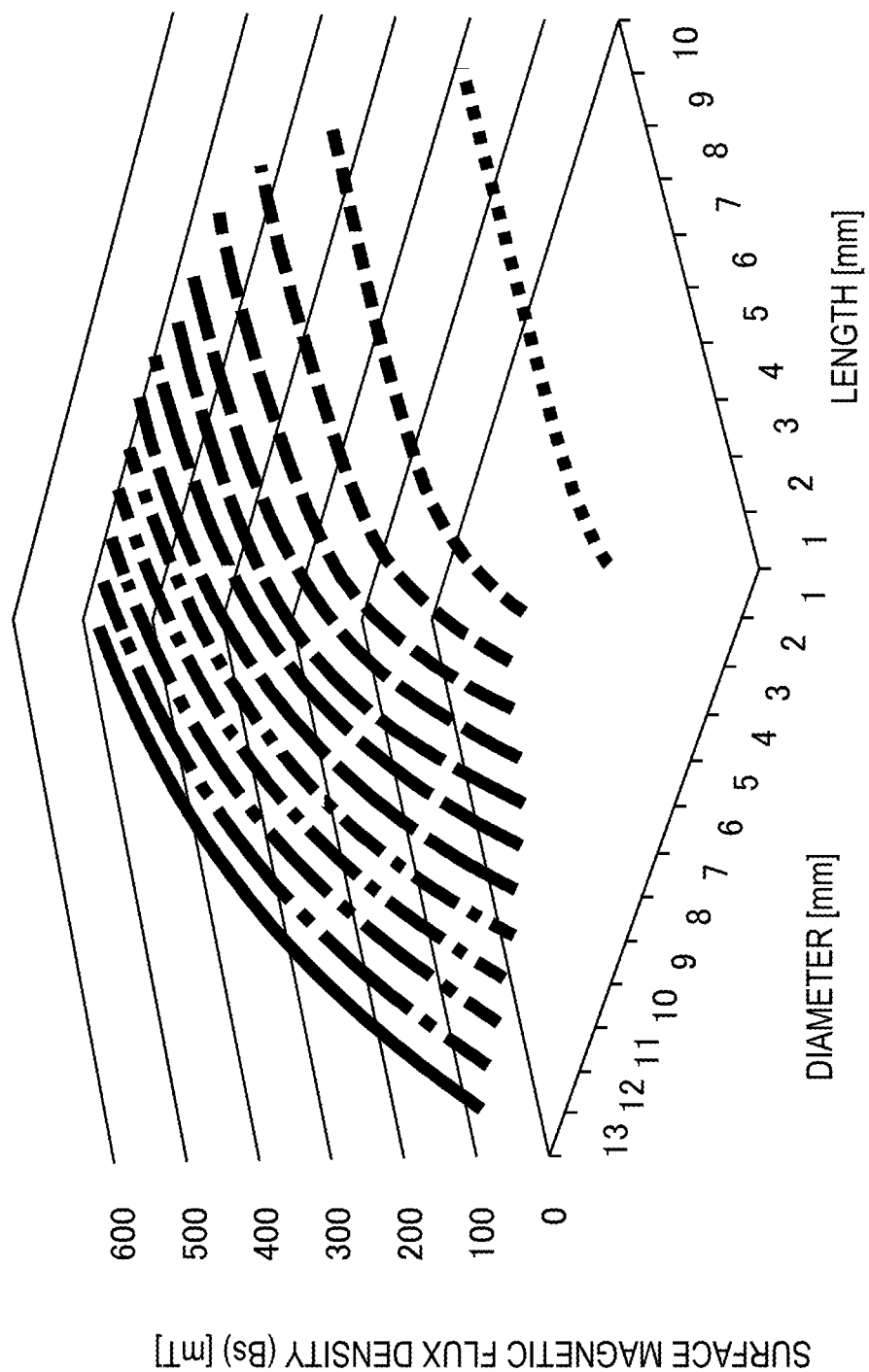
FIG. 4 is a graph illustrating a relation between a shape of a magnet and surface magnetic flux density.

As illustrated in FIG. 3C and FIG. 3D, the magnetization component 11 which replaces the cutter component 101 includes a magnet 11a which magnetizes an object and has a columnar shape (a magnet which is supported by an attachment mechanism and is configured such that the magnetic pole thereof is opposed to the object when the attachment mechanism is attached on an attachment position), a fixing portion 11b in which the magnet 11a is fixed and which has a columnar shape (an attachment mechanism which has the substantially same configuration as that of an attachment part of the cutter component with respect to an attachment position), and a cap portion 11c. The magnet 11a is a permanent magnet such as a neodymium magnet. When a neodymium magnet is used as the magnet 11a, surface magnetic flux density of an end portion 11aa of the magnet 11a varies depending on a shape of the magnet 11a. FIG. 4 illustrates surface magnetic flux density (Bs) [mT] at the centers on bottom surfaces of columns of columnar neodymium magnets having different diameters [mm] and lengths [mm]. As illustrated in FIG. 4, the magnet 11a has larger surface magnetic flux density as the diameter thereof is larger. However, if the diameter is too larger, the magnetic flux density at the center is lowered and resolution of a pattern which can magnetize the magnetic sheet 18 is lowered. Surface magnetic flux density is larger as the length of the magnet 11a is greater when the magnets 11a have the same diameters as each other. The length of the magnet 11a is, however, limited due to the restriction as the magnetization component 11 which can replace the cutter component 101. A neodymium magnet having the diameter of 2 mm and the length of 10 mm can be used as the magnet 11a, for example. The end portion 11aa on one end of the magnet 11a has either magnetic pole (the S pole or the N pole) and the other end is fixed to the fixing portion 11b. The magnet 11a may be attachable to and detachable from the fixing portion 11b or does not have to be attachable and detachable. A through hole 11ca is formed on an end side of the cap portion 11c. The cap portion 11c can be attached to the magnet 11a side of the fixing portion 11b. When the cap portion 11c is attached to the magnet 11a side of the fixing portion 11b, the end portion 11aa of the magnet 11a protrudes to the outside of the cap portion 11c through the through hole 11ca (the magnetic pole of the magnet 11a is disposed on the outside of the cap portion 11c). An attachment region 11ba is provided on an outer lateral surface of the fixing portion 11b and this attachment region 11ba can be fixed on an attachment position of the above-mentioned cutting plotter.

In the present embodiment, the outer shape of the fixing portion 11b is substantially the same as the outer shape of the fixing portion 101b and the position and the shape of the attachment region 11ba (the configuration of the attachment mechanism) are also substantially the same as the position and the shape of the attachment region 101ba (the attachment part of the cutter component with respect to the attachment position). The outer shape of the cap portion 11c is preferably substantially the same as the outer shape of the cap portion 101c, but these shapes may be different from each other. A relative position of the end portion 11aa with respect to the attachment region 11ba is preferably substantially the same as a relative position of the cutting edge 101aa with respect to the attachment region 101ba. The length of the end portion 11aa positioned in the outside of the cap portion 11c when the cap portion 11c is attached to the fixing portion 11b is preferably substantially the same as the length of the cutting edge 101aa positioned in the outside of the cap portion 101c when the cap portion 101c is attached to the fixing portion 101b. The cutter component 101 in which the cutter portion 101a is replaced with the magnet 11a, for example, may be used as the magnetization component 11. In this case, the fixing portion 101b is equivalent to the fixing portion 11b and the cap portion 101c is equivalent to the cap portion 11c. In such a case, it is preferable that the shape of the cutter component 101 on the fixing portion 101b side is substantially the same as the shape of the magnetization component 11 on the fixing portion 11b side. Accordingly, the magnetization component 11 can be produced from the known cutter component 101 without specially installing a spacer and machining. Here, "α is substantially the same as β" means that α and β are the same as each other or α and β approximate each other.

<<Cutter Component Attachment Unit 12 and Drawing Head 13>>

By fixing the attachment region 101ba of the cutter component 101 on the cutter component attachment unit 12, the cutter component 101 is attached to the drawing head 13.

Figure 2B:
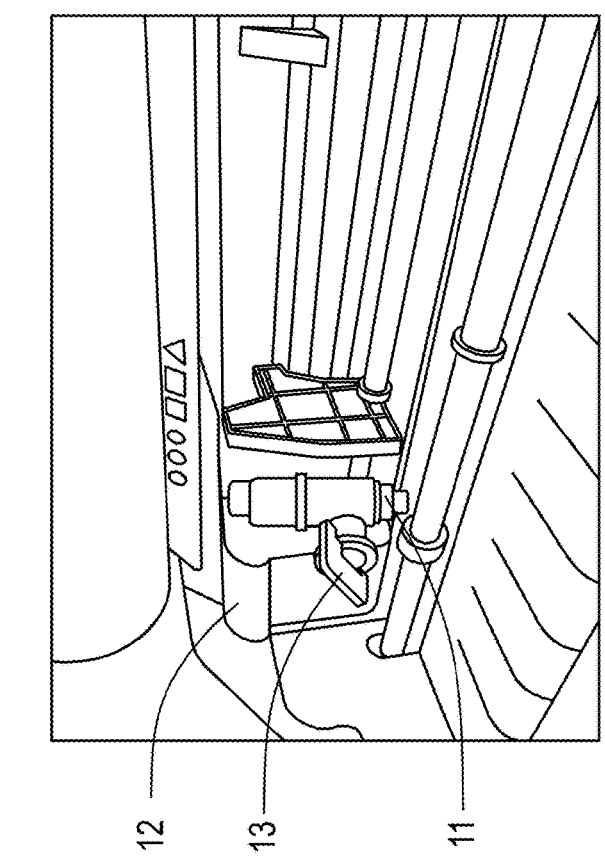

In the present embodiment, instead of the cutter component 101, by fixing the attachment region 11ba of the magnetization component 11 on the cutter component attachment unit 12 (the attachment position of the cutter component), the magnetization component 11 is attached to the drawing head 13 (FIG. 1 and FIG. 2B). The magnetization component 11 attached to the cutter component attachment unit 12 is positioned so that the end portion 11aa (magnetic pole) of the magnet 11a of the magnetization component 11 is opposed to a surface 18a of the magnetic sheet 18 (object) which is disposed as a magnetization object. That is, the magnetization component 11 which is a component including the magnet 11a whose magnetic pole (the S pole or the N pole) is opposite to that of the surface 18a of the magnetic sheet 18 is attached to the cutter component attachment unit 12. The end portion 11aa of the magnet 11a is set to the N pole when the surface 18a of the magnetic sheet 18 is magnetized to the S pole, while the end portion 11aa of the magnet 11a is set to the S pole when the surface 18a of the magnetic sheet 18 is magnetized to the N pole. The case where the surface 18a of the magnetic sheet 18 needs to be magnetized to the S pole and the N pole requires the magnetization component 11 including the magnet 11a whose end portion 11aa is on the N pole (for magnetization to the S pole) and the magnetization component 11 including the magnet 11a whose end portion 11aa is on the S pole (for magnetization to the N pole). If the magnet 11a is attachable to and detachable from the fixing portion 11b, the magnet 11a whose end portion 11aa is on the N pole may be attached to the fixing portion 11b when the surface 18a of the magnetic sheet 18 is magnetized to the S pole, and the magnet 11a whose end portion 11aa is on the S pole may be attached to the fixing portion 11b when the surface 18a of the magnetic sheet 18 is magnetized to the N pole. Two ends of the magnet 11a may have magnetic poles opposite to each other (the S pole and the N pole), and one end selected from the two ends may be set as the end portion 11aa and the other end may be able to be fixed on the fixing portion 11b. That is, the magnet 11a may be reversible with respect to the fixing portion 11b and either one end (the S pole or the N pole) of the magnet 11a can be selected as the end portion 11aa. As described later, positions of the drawing head 13 and the magnetic sheet 18 are digitally controlled and thus, the relative position of the drawing head 13 with respect to the surface 18a of the magnetic sheet 18 can be changed. Here, a surface different from the surface 18a of the magnetic sheet 18 is magnetized to the opposite magnetic pole to that of the surface 18a. That is, magnetization of the surface 18a of the magnetic sheet 18 also means magnetization of the magnetic sheet 18 itself.

<<Input Unit 14, Storage 15, Control Unit 16, and Driving Unit 17>>

The input unit 14, the storage 15, the control unit 16, and the driving unit 17 are functional components originally provided to the cutting plotter. The input unit 14 is an input interface, the storage 15 is a random-access memory (RAM), hard disk, and the like, and the driving unit 17 is a driving device composed of a motor, an actuator, and the like. The control unit 16 may be configured through execution of a predetermined program by a computer including a processor (hardware processor) such as a central processing unit (CPU), a memory such as a random-access memory (RAM) and a read-only memory (ROM), and the like, and may be configured by an integrated circuit.

<<Magnetic Sheet 18>>

The magnetic sheet 18 is a sheet mainly made of a ferromagnetic material, and is a magnetic rubber sheet mainly made of magnetic rubber, a magnetic plastic sheet mainly made of magnetic plastic, or a magnetic metal sheet mainly made of metal, for example. If a ferromagnetic material is exposed in a strong magnetic field, atoms' dipoles are aligned with a magnetic field and the alignment remains even after the magnetic field is removed. A ferromagnetic material which is once magnetized maintains the direction of the magnetic pole thereof until a sufficiently-strong opposite magnetic field, strong impact, or sufficient heat is applied to the ferromagnetic material. Utilizing this property in the present embodiment, the magnetic sheet 18 is magnetized by the magnet 11a of the magnetization component 11 in a rewritable manner.

<Operation>

Figure 5:
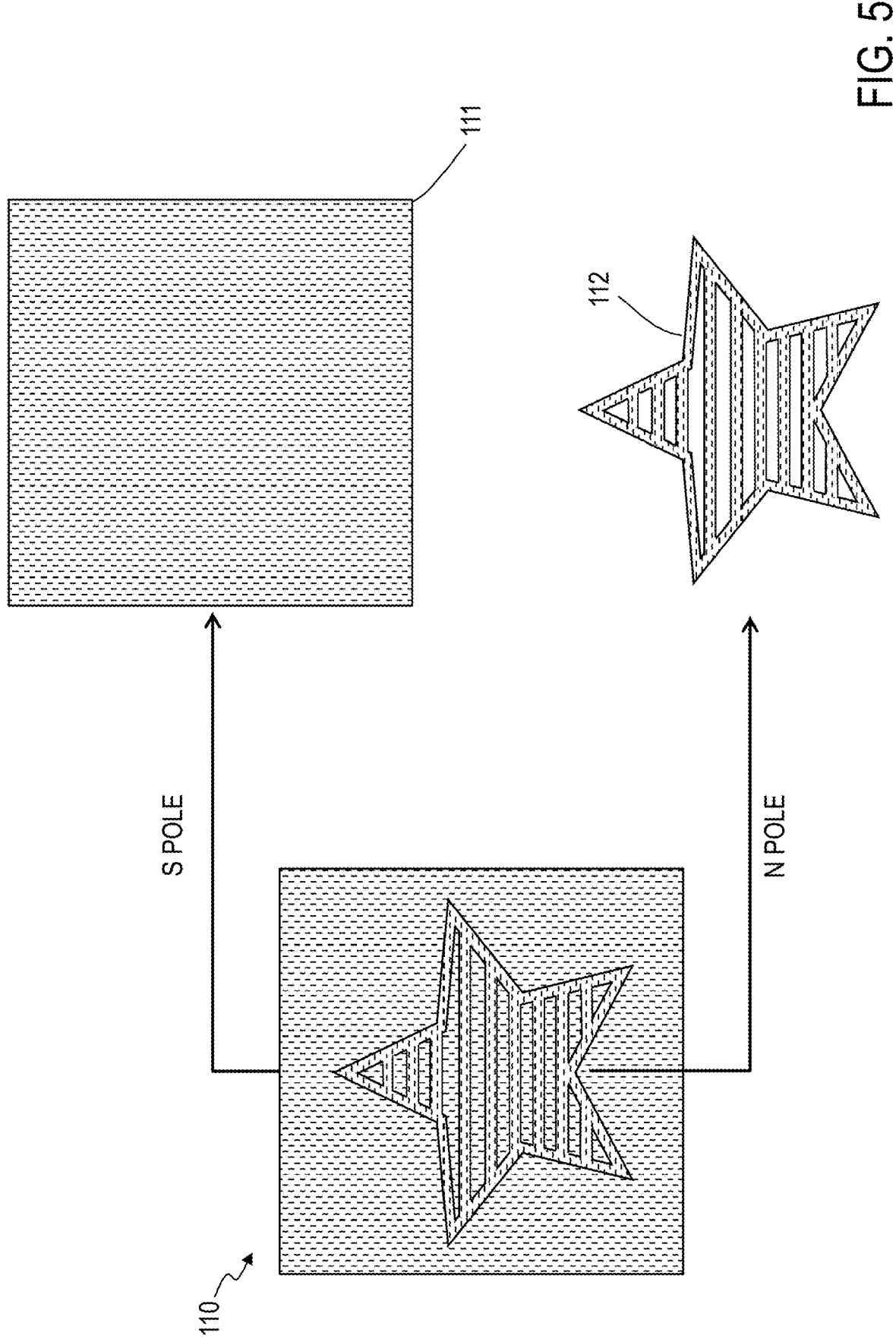
FIG. 5 is a diagram illustrating texture information including S-pole pattern information and N-pole pattern information.

A magnetization method according to the present embodiment is described. Texture information representing a pattern for magnetizing the surface 18a of the magnetic sheet 18 (magnetization pattern) is inputted into the input unit 14 of the magnetization device 1 (FIG. 1). The texture information is two dimensional data representing which coordinate of the surface 18a of the magnetic sheet 18 is to be magnetized. When the magnetization pattern is for magnetizing the surface 18a of the magnetic sheet 18 to either one magnetic pole (the S pole or the N pole) (when the magnetization pattern corresponds to only one magnetic pole), texture information includes pattern information representing a pattern for magnetization to the corresponding magnetic pole. On the other hand, when the magnetization pattern is for magnetizing the surface 18a of the magnetic sheet 18 to both magnetic poles (the S pole and the N pole) (when the magnetization pattern corresponds to both magnetic poles), texture information includes pattern information representing a pattern for magnetization to one magnetic pole (the S pole, for example) (first pattern information representing a pattern corresponding to one magnetic pole) and pattern information representing a pattern for magnetization to the other magnetic pole (the N pole, for example) (second pattern information representing a pattern corresponding to the other magnetic pole). FIG. 5 illustrates a magnetization pattern 110 for magnetizing the surface 18a of the magnetic sheet 18 to both magnetic poles. As illustrated in FIG. 5, the magnetization pattern 110 includes a pattern 111 for magnetization to the S pole and a pattern 112 for magnetization to the N pole. Texture information in this case includes information representing the pattern 111 and information representing the pattern 112. The texture information may be image data in a vector format which is produced by drawing software or may be image data in a raster format (bitmap image data) to which such image data is converted. The inputted texture information is stored in the storage 15. Further, the magnetic sheet 18 is placed on the magnetization device 1. Accordingly, the end portion 11aa (magnetic pole) of the magnet 11a in the magnetization component 11 attached to the cutter component attachment unit 12 is opposed to the surface 18a of the magnetic sheet 18.

When the magnetization device 1 which is a cutting plotter is operated, the control unit 16 reads the texture information from the storage 15 and changes a relative position of the drawing head 13 with respect to the surface 18a of the magnetic sheet 18 by controlling the driving unit 17 so as to magnetize the surface 18a of the magnetic sheet 18 to a pattern corresponding to the texture information by the magnetic force of the end portion 11aa of the magnet 11a (magnetization corresponding to the texture information is performed with respect to the surface 18a of the magnetic sheet 18). That is, the driving unit 17 moves the drawing head 13 along at least either one of the X axis and the Z axis, being able to change a relative position of the end portion 11aa of the magnet 11a with respect to the surface 18a of the magnetic sheet 18. The driving unit 17 further moves the magnetic sheet 18 along the Y axis, being able to change the relative position of the end portion 11aa of the magnet 11a with respect to the surface 18a of the magnetic sheet 18. Here, the X axis, the Y axis, and the Z axis are coordinate axes which are orthogonal to each other. The X-Y plane passing the X axis and the Y axis is substantially parallel (parallel, for example) to the surface 18a of the magnetic sheet 18 and the Z axis is substantially orthogonal (orthogonal, for example) to the surface 18a of the magnetic sheet 18. If the relative position of the drawing head 13 with respect to the magnetic sheet 18 is changed along the X coordinate and/or the Y axis, an (X,Y) coordinate of the end portion 11aa of the magnet 11a on the surface 18a of the magnetic sheet 18 can be changed and the magnetization position in the surface 18a of the magnetic sheet 18 can be changed. If the relative position of the drawing head 13 with respect to the magnetic sheet 18 is changed along the Z coordinate, a distance between the surface 18a of the magnetic sheet 18 and the end portion 11aa of the magnet 11a can be changed. The surface 18a of the magnetic sheet 18 is magnetized when the surface 18a of the magnetic sheet 18 and the end portion 11aa of the magnet 11a are brought in contact with or close to each other. Thus, existence of magnetization can be controlled by changing the distance between the surface 18a of the magnetic sheet 18 and the end portion 11aa of the magnet 11a. The driving unit 17 changes the relative position between the drawing head 13 and the magnetic sheet 18 along the X axis, the Y axis, and the Z axis based on the texture information so as to magnetize the surface 18a side of the magnetic sheet 18 in the magnetization pattern represented by the texture information. Here, when the magnetization pattern is for magnetizing the surface 18a of the magnetic sheet 18 to both magnetic poles (the S pole and the N pole), the driving unit 17 magnetizes the surface 18a side of the magnetic sheet 18 in a pattern corresponding to each magnetic pole. When magnetization is performed based on a pattern for magnetization to the S pole, the driving unit 17 changes the relative position between the drawing head 13 and the magnetic sheet 18 along the X axis, the Y axis, and the Z axis in accordance with the S-pole pattern so as to magnetize the surface 18a of the magnetic sheet 18 with the S-pole pattern (the pattern 111 in FIG. 5, for example) by using the magnetization component 11 which includes the magnet 11a having the end portion 11aa of the N pole. When magnetization is performed based on a pattern for magnetization to the N pole, the driving unit 17 changes the relative position between the drawing head 13 and the magnetic sheet 18 along the X axis, the Y axis, and the Z axis in accordance with the N-pole pattern so as to magnetize the surface 18a of the magnetic sheet 18 with the N-pole pattern (the pattern 112 in FIG. 5, for example) by using the magnetization component 11 which includes the magnet 11a having the end portion 11aa of the S pole. That is, when the N pole (the other magnetic pole) of the magnet 11a included in the magnetization component 11 is opposed to the surface 18a of the magnetic sheet 18, the surface 18a of the magnetic sheet 18 is magnetized with the S-pole pattern (the pattern 111 in FIG. 5, for example) (magnetization corresponding to first pattern information). On the other hand, when the S pole (one magnetic pole) of the magnet 11a included in the magnetization component 11 is opposed to the surface 18a of the magnetic sheet 18, the surface 18a of the magnetic sheet 18 is magnetized with the N-pole pattern (the pattern 112 in FIG. 5, for example) (magnetization corresponding to second pattern information). The method for switching the magnetic poles of the end portion 11aa is as described above.

The following two types of magnetization methods can be assumed.

Sliding method: A method in which an (X,Y) coordinate of the drawing head 13 on the magnetic sheet 18 is changed while keeping the magnetic pole of the end portion 11aa of the magnet 11a in contact with or close to the surface 18a of the magnetic sheet 18.

Plotting method: A method in which an (X,Y) coordinate of the drawing head 13 on the magnetic sheet 18 is changed while keeping the magnetic pole of the end portion 11aa of the magnet 11a separate from the surface 18a of the magnetic sheet 18 and the magnetic pole of the end portion 11aa of the magnet 11a is brought into contact with or close to the surface 18a of the magnetic sheet 18 on a coordinate on which magnetization is to be performed.

Though high speed magnetization can be realized in the sliding method, directions of atoms' dipoles on a magnetized part may not be able to be orthogonally aligned to the surface 18a and surface magnetic flux density may be accordingly lowered. On the other hand, directions of atoms' dipoles on a magnetized part can be orthogonally aligned to the surface 18a in the plotting method, but the magnetization requires much time. Comparison results in the number of steps, processing time, and surface magnetic flux density obtained when magnetization with the same patterns are performed by the plotting method, in which magnetization is performed at 2 mm interval and 1 mm interval, and the sliding method are illustrated.

TABLE 1

| Magnetization method | Number of steps | Processing time [s] | Bs [mT] |
| --- | --- | --- | --- |
| Plotting method (2 mm interval) | 176 | 57.0 | Max: 28.6, Min: 6.7 |
| Plotting method (1 mm interval) | 352 | 96.4 | Max: 24.1, Min: 18.7 |
| Sliding method | 11 | 8.3 | Max: 25.5, Min: 22.3 |

This result shows that there is not large difference among the maximum values of the surface magnetic flux density in the plotting method and the sliding method. Further, it is understood that the number of steps and the processing time in the slide method are particularly smaller than those in the plotting method. Further, when magnetization is performed at 2 mm interval with the plotting method, the minimum value of the surface magnetic flux density is largely lowered. This is because an interval between magnetization points has been increased and the surface magnetic flux density has become uneven. The above shows that it is more preferable to perform magnetization by using the sliding method than the plotting method.

<Characteristics of Present Embodiment>

Magnetization can be performed with an arbitrary magnetic pattern without using a dedicated device for magnetization in the present embodiment.

[Modification of First Embodiment]

The magnetic poles of the end portion 11aa of the magnet 11a are manually switched when the surface 18a of the magnetic sheet 18 is magnetized to both magnetic poles (the S pole and the N pole), in the first embodiment. However, the magnetic poles of the end portion 11aa of the magnet 11a may be automatically switched. That is, the N pole (the other magnetic pole) of the magnet 11a included in the magnetization component 11 may be automatically made opposed to the surface 18a of the magnetic sheet 18 when the surface 18a of the magnetic sheet 18 is magnetized with the S-pole pattern (magnetization corresponding to the first pattern information), and the S pole (one magnetic pole) of the magnet 11a included in the magnetization component 11 may be automatically made opposed to the surface 18a of the magnetic sheet 18 when the surface 18a of the magnetic sheet 18 is magnetized with the N-pole pattern (magnetization corresponding to the second pattern information). Namely, polarity of the magnetic pole opposed to the surface 18a of the magnetic sheet 18 (object) may be able to be switched when the fixing portion 11b (attachment mechanism) is attached to the cutter component attachment unit 12 (attachment position). For example, the magnetic poles of the end portion 11aa in the magnet 11a may be automatically switched by physically reversing the magnet 11a of the magnetization component 11. Alternatively, an electromagnet may be used as the magnet 11a and the magnetic poles of the end portion 11aa in the magnet 11a may be automatically switched by switching a direction of current supplied to the electromagnet.

Second Embodiment

In a second embodiment, perception of bumpiness (also referred to as "unevenness") is provided by using two objects which are magnetized with patterns having the S pole and the N pole. A force sense presenting object according to the present embodiment has a "first object" and a "second object". The "first object" includes a "first surface" and the "first surface" is magnetized with a "first texture" including an S-pole region and an N-pole region. The "second object" includes a "second surface" and the "second surface" is magnetized with a "second texture" including an S-pole region and an N-pole region. Here, an "acting subject" that is a human being or an animal other than a human being touches at least either one of the "first object" and the "second object" and performs an operation for changing a relative positional relation between the "first surface" and the "second surface" and/or an action for changing the relative positional relation between the "first surface" and the "second surface" while keeping the "first surface" and the "second surface" in contact with or close to each other. Accordingly, the "acting subject" perceives bumpiness. That is, the "acting subject" touches at least either one of the "first object" and the "second object" and performs the operation for changing the relative positional relation between the "first surface" and the "second surface" or/and the action for changing the relative positional relation between the "first surface" and the "second surface" while keeping the "first surface" and the "second surface" in contact with or close to each other. Accordingly, shearing stress received by the "acting subject" from at least one of the "first object" and the "second object" periodically changes. Change in shearing stress is change in a linear direction included in a plane along the "first surface" and the "second surface", and the "acting subject" perceives (has an illusion) this change as bumpiness substantially orthogonal to the "first surface" and the "second surface". In the "first texture" and the "second texture", regions magnetized to the S pole and regions magnetized to the N pole are periodically arranged in an alternate manner, for example. The "first texture" and the "second texture" may be textures in which belt-like regions magnetized to the S pole and belt-like regions magnetized to the N pole are periodically arranged in an alternate manner or may include periodical nearly-checkered regions magnetized to the S pole and periodical nearly-checkered regions magnetized to the N pole, for example. A pattern of the "first texture" and a pattern of the "second texture" may be the same as each other or different from each other. The way of change in shearing stress received by the "acting subject" from at least one of the "first object" and the "second object" varies and bumpy feeling perceived by the "acting subject" also varies depending on a combination between a pattern of the "first texture" and a pattern of the "second texture". The way of change in shearing stress received by the "acting subject" from at least one of the "first object" and the "second object" may vary depending on a direction in which the relative positional relation between the "first surface" and the "second surface" is changed. In this case, bumpy feeling perceived by the "acting subject" varies as well depending on the direction in which the relative positional relation between the "first surface" and the "second surface" is changed. For example, the "first texture" and the "second texture" may be textures on which tape-like regions magnetized to the S pole and tape-like regions magnetized to the N pole are periodically arranged in an alternate manner. The operation for changing the relative positional relation between the "first surface" and the "second surface" or/and the action for changing the relative positional relation between the "first surface" and the "second surface" may be performed while keeping the "first surface" and the "second surface" in contact with or close to each other so that the longitudinal direction of the tape-like regions of the "first texture" follows the longitudinal direction of the tape-like regions of the "second texture". In this case, the way of change in shearing stress received by the "acting subject" from at least one of the "first object" and the "second object" varies and bumpy feeling perceived by the "acting subject" also varies depending on whether the relative positional relation between the "first surface" and the "second surface" is changed in the longitudinal direction of the tape-like regions or the short side direction of the same. Any of the following (1) to (3) or a combination of a part or all of these is the example of the operation for changing the relative positional relation between the "first surface" and the "second surface" or/and the action for changing the relative positional relation between the "first surface" and the "second surface".

(1) An action for changing the relative positional relation between the "first surface" and the "second surface" by directly moving at least one of the "first object" and the "second object" by the "acting subject".

(2) An action for changing the relative positional relation between the "first surface" and the "second surface" by moving a thing interposed between at least one of the "first object" and the "second object" and the "acting subject" by the "acting subject" so as to indirectly move at least one of the "first object" and the "second object".

(3) An operation for changing the relative positional relation between the "first surface" and the "second surface" by driving a device which automatically moves at least one of the "first object" and the "second object" by the "acting subject".

Further, "changing the relative positional relation between the first surface and the second surface" means sliding the "second surface" with respect to the "first surface" and sliding the "first surface" with respect to the "second surface", for example.

Specific examples of the present embodiment are described below with reference to the accompanying drawings.

A magnetic sheet 210 in FIG. 6A is a specific example of the "first object" and a magnetic sheet 220 in FIG. 6B is a specific example of the "second object". One surface 211 (first surface) of the magnetic sheet 210 is magnetized with a texture (first texture) including S-pole regions 211a and N-pole regions 211b. The regions 211a which have a belt-like (tape-like) shape and are magnetized to the S pole and the regions 211b which have a belt-like (tape-like) shape and are magnetized to the N pole are periodically arranged on the surface 211 in an alternate manner. In a similar manner, one surface 221 (the second surface) of the magnetic sheet 220 is magnetized with a texture (second texture) including S-pole regions 221a and N-pole regions 221b. The regions 221a which have a belt-like (tape-like) shape and are magnetized to the S pole and the regions 221b which have a belt-like (tape-like) shape and are magnetized to the N pole are periodically arranged on the surface 221 in an alternate manner. In this example, each of the width (pitch) in the short side direction of the region 211a, the width (pitch) in the short side direction of the region 211b, the width (pitch) in the short side direction of the region 221a, and the width (pitch) in the short side direction of the region 221b is 2 mm. Further, FIG. 6A and FIG. 6B express difference in magnetic poles of the region 211a, the region 211b, the region 221a, and the region 221b by difference of drawing patterns. The region 211a, the region 211b, the region 221a, and the region 221b are not separately painted in a visually recognizable manner. That is, these textures are magnetization patterns but are not a visually separately painted patterns (the same is applied to the below). The magnetic sheets 210 and 220 are magnetized by the method described in the first embodiment, for example. However, the magnetic sheets 210 and 220 may be magnetized by a method other than the above method (the same is applied to the below).

Figure 7:
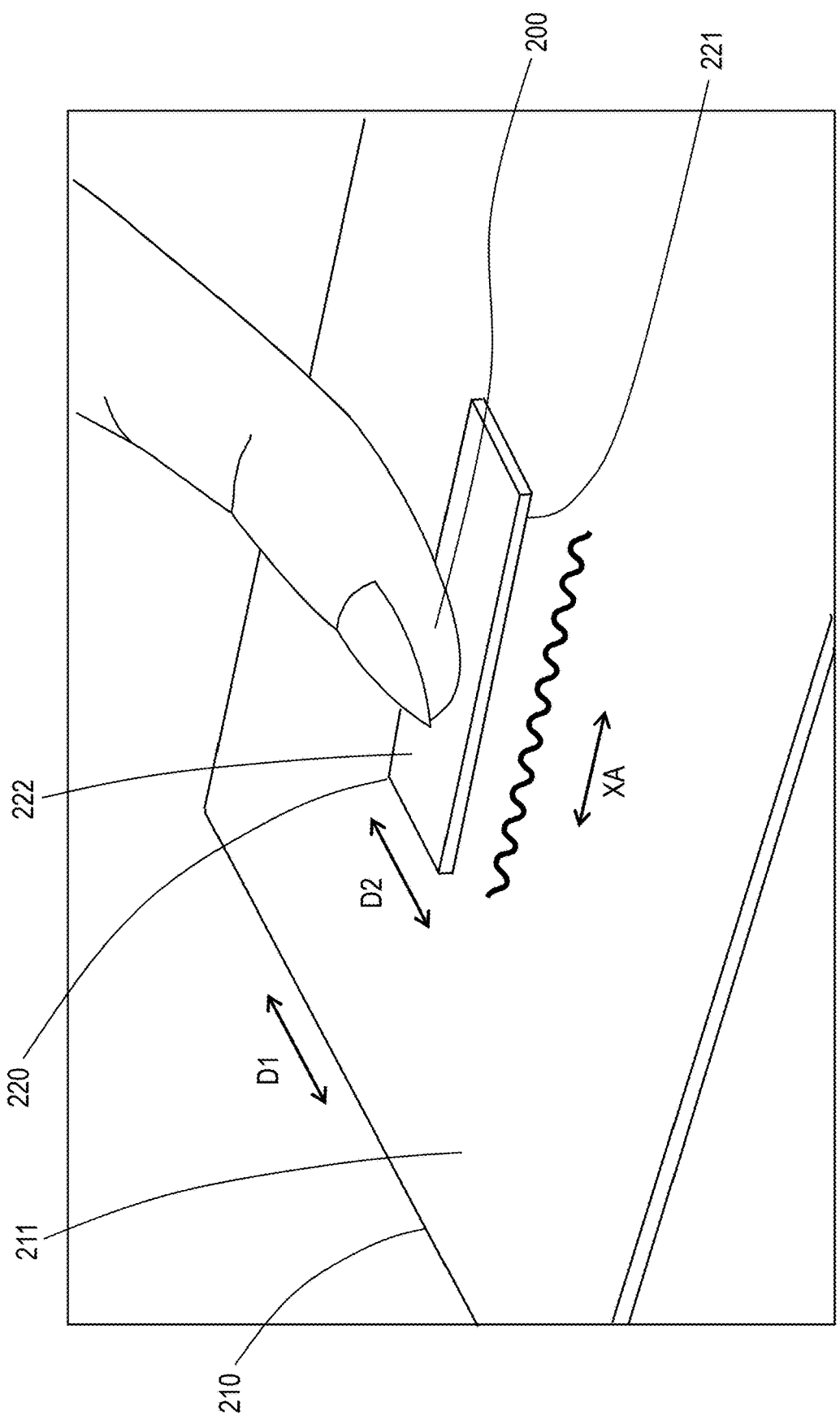
FIG. 7 is a diagram illustrating an action for presenting bumpy feeling by two magnetic sheets.
Figure 10C:
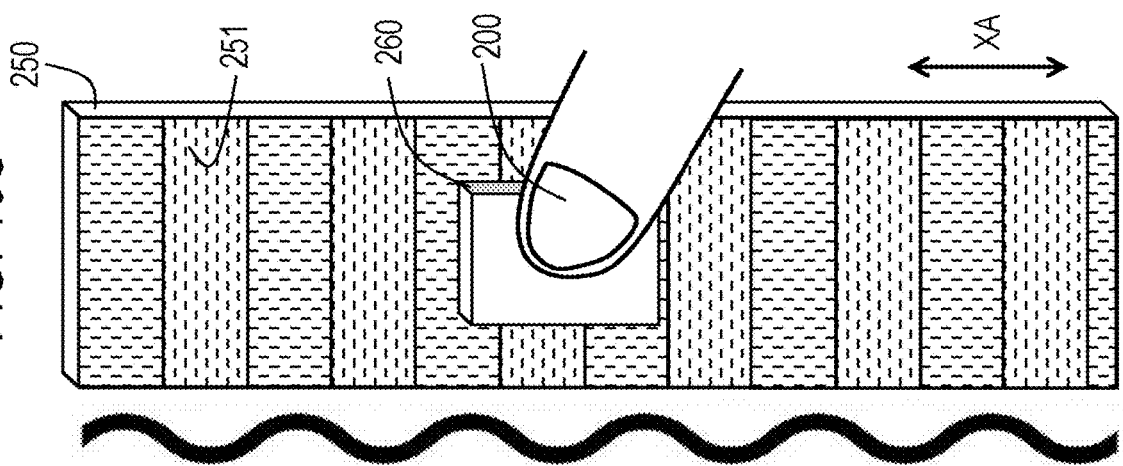
FIG. 10A to FIG. 10C are diagrams illustrating an action for presenting bumpy feeling by two magnetic sheets.
Figure 10B:
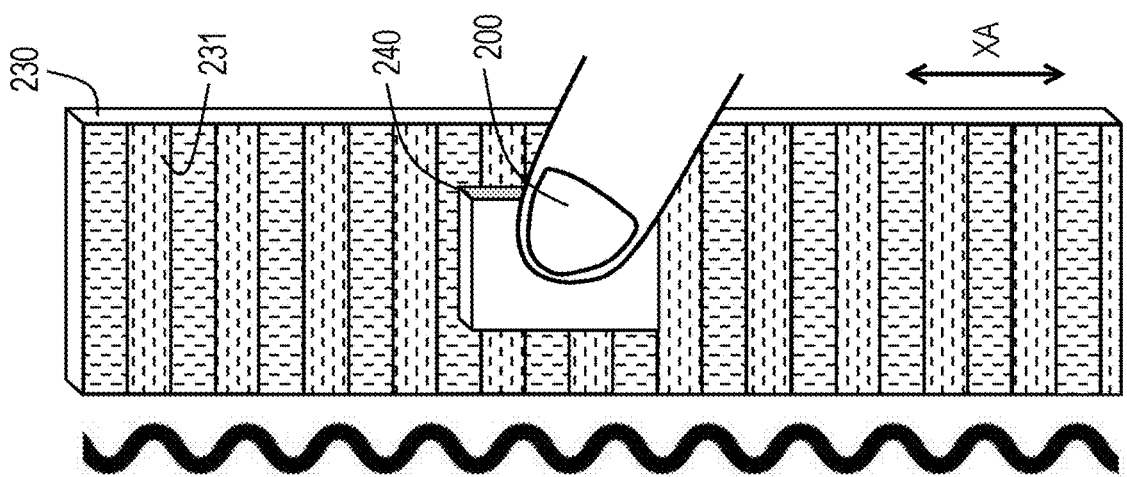
Figure 10A:
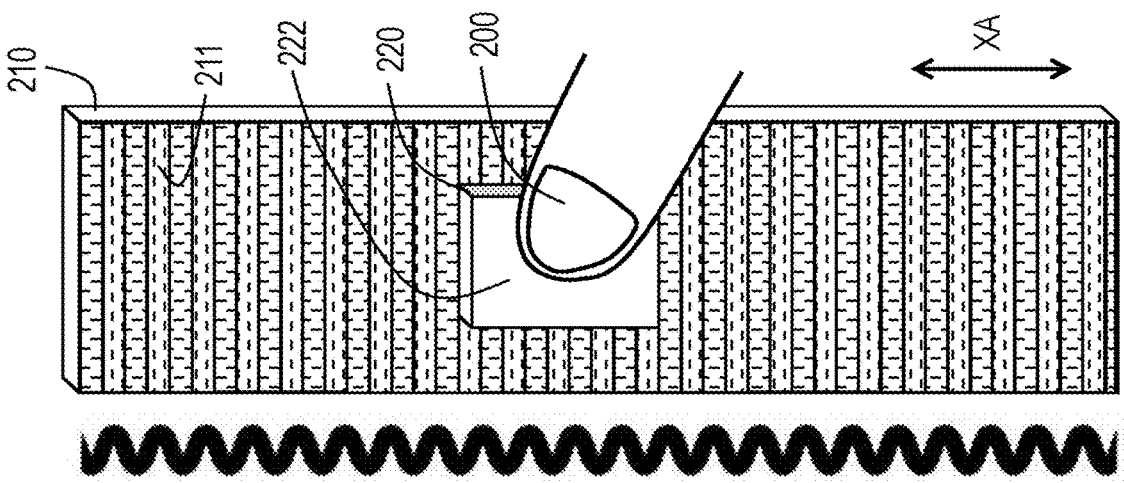

As illustrated in FIG. 7, FIG. 8, and FIG. 10A, a user (acting subject) places the magnetic sheet 210 so that the surface 211 faces upward and the user places the magnetic sheet 220 so that the surface 221 is in contact with the surface 211. Here, the magnetic sheet 220 is layered on the magnetic sheet 210 in a direction in which the longitudinal direction D1 of the regions 211a and 211b of the magnetic sheet 210 follows the longitudinal direction D2 of the regions 221a and 221b of the magnetic sheet 220. For example, the magnetic sheet 220 is layered on the magnetic sheet 210 so that the longitudinal direction D1 is along the longitudinal direction D2 (in other words, so that the longitudinal direction D1 and the longitudinal direction D2 are substantially parallel to each other). The user touches the other surface 222 of the magnetic sheet 220, which is layered on the magnetic sheet 210, with the finger 200 and performs an operation for changing a relative positional relation between the surface 211 and the surface 221 while keeping the surface 211 and the surface 221 in contact with or close to (nearly in contact with) each other. In the example of FIG. 7 and FIG. 8, the relative positional relation between the surface 211 and the surface 221 is changed in the XA direction which is the short side direction of the regions 211a and 211b of the magnetic sheet 210. Accordingly, shearing stress in the XA direction received by the user from the magnetic sheet 220 periodically changes. As a result, the user perceives bumpy feeling in a direction substantially orthogonal to the surface 221. Here, when the relative positional relation between the surface 211 and the surface 221 is changed in the longitudinal direction of the regions 211a and 211b of the magnetic sheet 210, shearing stress received by the user does not change and the user does not perceive bumpy feeling. The way of change in shearing stress received by the user from the magnetic sheet 220 varies and bumpy feeling perceived by the user also varies depending on a direction in which the relative positional relation between the surface 211 and the surface 221 is changed.

FIG. 9A and FIG. 9B respectively illustrate magnetic sheets 230 and 250 whose pitches are different from the pitch of the magnetic sheet 210 and FIG. 9C and FIG. 9D respectively illustrate magnetic sheets 240 and 260 whose pitches are different from the pitch of the magnetic sheet 220. The magnetic sheets 230 and 250 are specific examples of the "first object" and the magnetic sheets 240 and 260 are specific examples of the "second object". Belt-like regions 231a magnetized to the S pole and belt-like regions 231b magnetized to the N pole are periodically arranged in an alternate manner on one surface 231 (first surface) of the magnetic sheet 230. Similarly, belt-like regions 241a magnetized to the S pole and belt-like regions 241b magnetized to the N pole are periodically arranged in an alternate manner on one surface 241 (second surface) of the magnetic sheet 240. Belt-like regions 251a magnetized to the S pole and belt-like regions 251b magnetized to the N pole are periodically arranged in an alternate manner on one surface 251 (first surface) of the magnetic sheet 250. In a similar manner, belt-like regions 261a magnetized to the S pole and belt-like regions 261b magnetized to the N pole are periodically arranged in an alternate manner on one surface 261 (second surface) of the magnetic sheet 260. Here, each of the width in the short side direction of the region 231a, the width in the short side direction of the region 231b, the width in the short side direction of the region 241a, and the width in the short side direction of the region 241b is 4 mm. Each of the width in the short side direction of the region 251a, the width in the short side direction of the region 251b, the width in the short side direction of the regions 261a, and the width in the short side direction of the region 261b is 6 mm.

When the magnetic sheet 230 is used as the "first object" and the magnetic sheet 240 is used as the "second object", a user performs an operation for changing a relative positional relation between the surface 231 and the surface 241 or/and an action for changing the relative positional relation between the surface 231 and the surface 241 while keeping the surface 231 and the surface 241 in contact with or close to each other and accordingly perceives bumpy feeling (FIG. 10B), similarly to the case where the magnetic sheets 210 and 220 are used by replacing the magnetic sheets 210 and 220, the surfaces 211 and 221, and the regions 211a, 211b. 221a, and 221b with the magnetic sheets 230 and 240, the surfaces 231 and 241, and the regions 231a, 231b, 241a, and 241b respectively. In a similar manner, when the magnetic sheet 250 is used as the "first object" and the magnetic sheet 260 is used as the "second object", a user performs an operation for changing a relative positional relation between the surface 251 and the surface 261 or/and an action for changing the relative positional relation between the surface 251 and the surface 261 while keeping the surface 251 and the surface 261 in contact with or close to each other and accordingly perceives bumpy feeling (FIG. 10C), similarly to the case where the magnetic sheets 210 and 220 are used by replacing the magnetic sheets 210 and 220, the surfaces 211 and 221, and the regions 211a, 211b, 221a, and 221b with the magnetic sheets 250 and 260, the surfaces 251 and 261, and the regions 251a, 251b, 261a, and 261b respectively.

Also, any of the magnetic sheets 210, 230, and 250 may be used as the "first object", any of the magnetic sheets 220, 240, and 260 may be used as the "second object", and the pitch of the "first object" and the pitch of the "second object" may be different from each other.

Pitches of magnetic sheets used as the "first object" and the "second object" affect shearing stress, that is, bumpy feeling perceived by a user. First, as illustrated from FIG. 10A to FIG. 10C, a spatial frequency of shearing stress perceived by a user, that is, spacing of bumpiness depends on a smaller pitch between a pitch of a magnetic sheet used as the "first object" and a pitch of a magnetic sheet used as the "second object". For example, spacing of bumpiness perceived when both of the pitch of a magnetic sheet used as the "first object" and the pitch of a magnetic sheet used as the "second object" are 2 mm as illustrated in FIG. 10A is narrower than spacing of bumpiness perceived when both of the pitch of a magnetic sheet used as the "first object" and the pitch of a magnetic sheet used as the "second object" are 4 mm as illustrated in FIG. 10B. Further, as illustrated from FIG. 11A to FIG. 11D, a magnitude of shearing stress, that is, a magnitude of bumpy feeling perceived by a user depends on a combination between the pitch of a magnetic sheet used as the "first object" and the pitch of a magnetic sheet used as the "second object". As illustrated in FIG. 11A and FIG. 11B, a difference between the maximum value (100%) and the minimum value (0%) of an attractive force area ratio between magnetic sheets used as the "first object" and the "second object" reaches the maximum and the magnitude of bumpy feeling perceived by a user reaches the maximum when the pitch of the magnetic sheet used as the "first object" and the pitch of the magnetic sheet used as the "second object" are the same as each other (when both are 2 mm, for example). As illustrated in FIG. 11A and FIG. 11C, when the pitch of a magnetic sheet used as the "first object" is 6 mm and a pitch of a magnetic sheet used as the "second object" is 2 mm, the maximum value and the minimum value of the attractive force area ratio between the magnetic sheets are respectively 66.67% and 33.33% and the magnitude of bumpy feeling perceived by a user is thus smaller than that obtained when the pitches of magnetic sheets used as the "first object" and the "second object" are the same as each other. Further, as illustrated in FIG. 11A and FIG. 11D, when the pitch of a magnetic sheet used as the "first object" is 4 mm and the pitch of a magnetic sheet used as the "second object" is 2 mm, the maximum value and the minimum value of the attractive force area ratio between the magnetic sheets are both 50% and a user accordingly does not perceive bumpy feeling.

The magnitude of bumpy feeling perceived by a user is formulated as the following. The pitch of the magnetic sheet A used as the "second object" is $p_A=n$ [mm] and the pitch of the magnetic sheet B used as the "first object" is $p_B=m$ [mm]. Here, $n \leq m$ holds. The attractive force area ratio $Ar_{(A,B)}$ on a surface on which these two magnetic sheets A and B are in contact with each other is expressed by a function f of two pitches $p_A$ and $p_B$.

$$Ar_{(A,B)} = f(p_A, p_B)[\%] \tag{1}$$

Here, the function f depends on patterns magnetizing the magnetic sheets A and B. Further, holding force ($H_{(A,B)}$ [g/cm$^2$]) generated between the two magnetic sheets A and B depends on $Ar_{(A,B)}$ and surface magnetic flux density $Bs_A$ and $Bs_B$ [mT] of both magnetic sheets A and B and is expressed by a function g.

$$H_{(A,B)} = g(Ar_{(A,B)}, Bs_{(A)}, Bs_{(B)})[g/cm^2] \tag{2}$$

The magnitude $V_{(A,B)}$ of bumpy feeling depends on the maximum value $H_{(A,B)MAX}$ of $H_{(A,B)}$ and is expressed by a function h, the bumpy feeling perceived when the relative positional relation between surfaces of the magnetic sheet A and the magnetic sheet B is changed while keeping the surfaces of these two magnetic sheets A and B in contact with or close to each other.

$$\begin{aligned} V_{(A,B)} &= h(H_{(A,B)MAX}) \\ &= h(g(Ar_{(A,B)}, Bs_{(A)}, Bs_{(B)})_{MAX}) \ (\because (2)) \\ &= h(g(f(p_A, p_B), p_A, p_B)_{MAX}) \ (\because (1), \end{aligned}$$

and when identical materials are used, surface magnetic flux density $Bs_A$ and $Bs_B$ mainly depend on the pitches $p_A$ and $p_B$ respectively)

$$= F(p_A, p_B) \tag{3}$$

Figure 12:
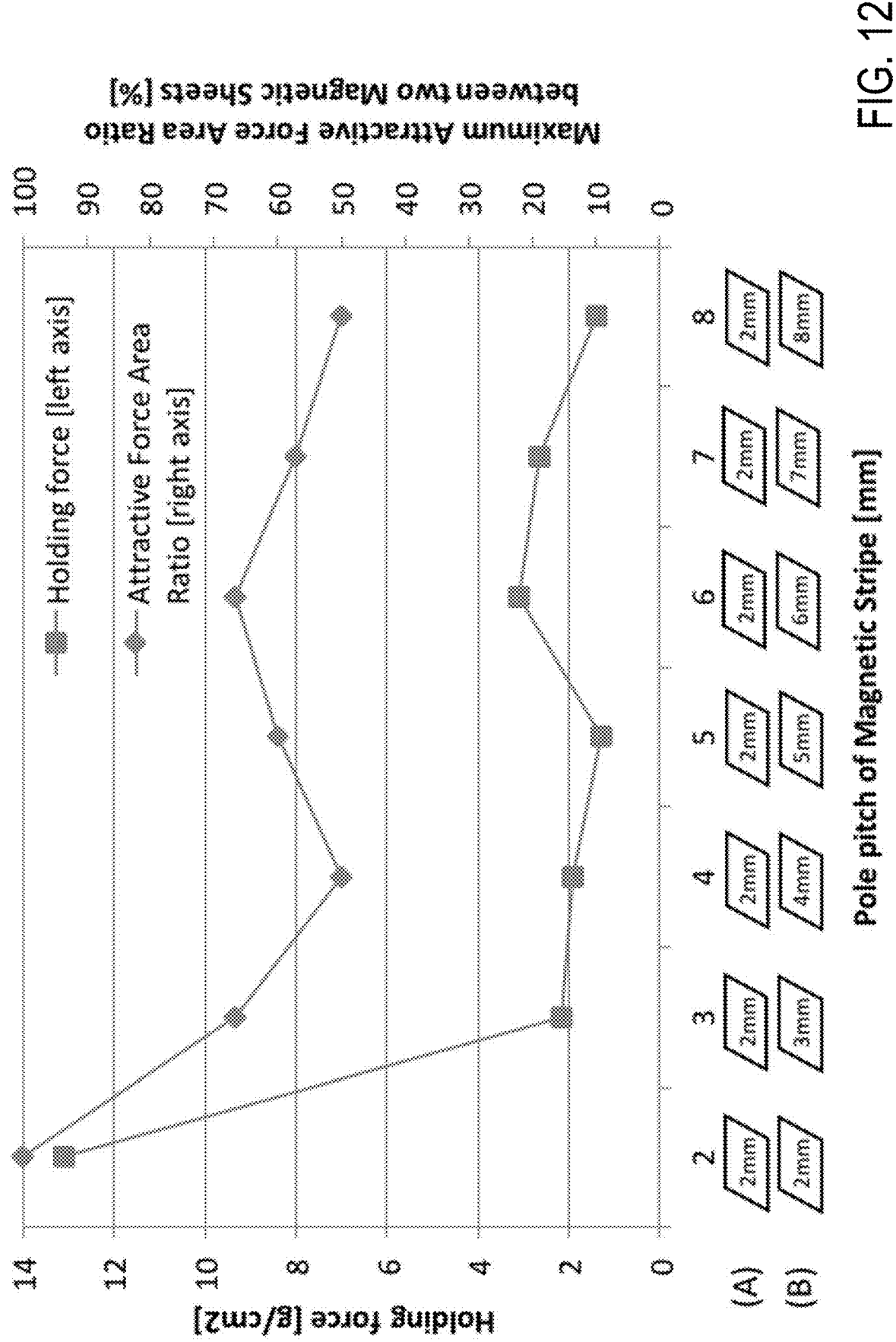
FIG. 12 is a diagram illustrating a relation among a pitch of a magnetic pattern, holding force, and an attractive force area ratio.

FIG. 12 illustrates a relation among the pitches $p_A$ and $p_B$ of the magnetic sheets A and B, holding force generated between the magnetic sheets A and B, and the maximum attractive force area ratio (the maximum value of the attractive force area ratio). The left vertical axis of FIG. 12 represents holding force, the right vertical axis represents maximum attractive force area ratio, and the horizontal axis represents the pitches $p_A$ and $p_B$ of the magnetic sheets A and B ((A) represents the pitch $p_A$ and (B) represents the pitch $p_B$). As illustrated, the magnitude of bumpiness perceived from the magnetic sheets A and B used as the "first object" and the "second object" vary depending on the pitches of the magnetic sheets A and B.

Figure 13A:
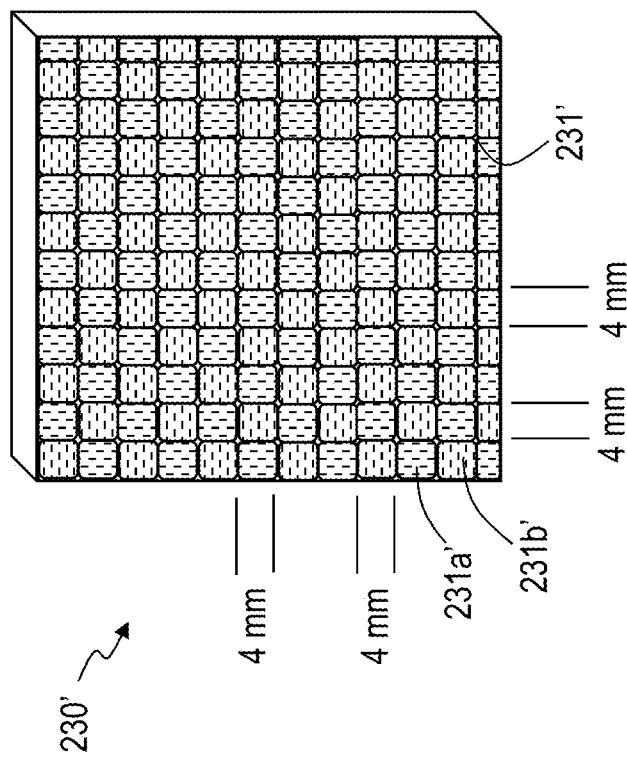
FIG. 13A to FIG. 13D are diagrams illustrating magnetized magnetic sheets.
Figure 13B:
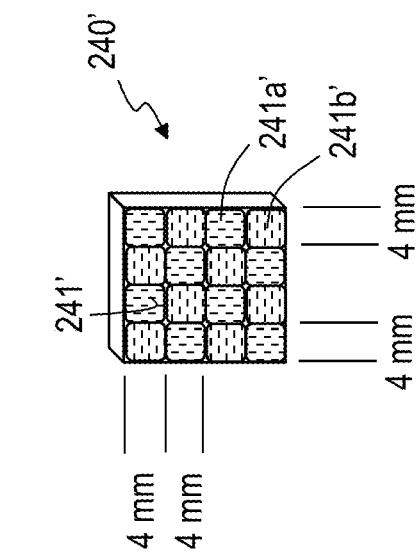
Figure 13C:
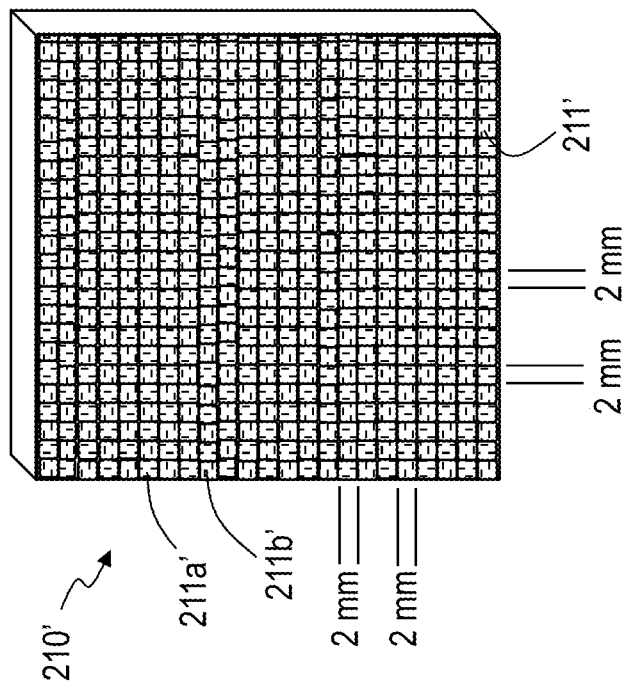
Figure 13D:
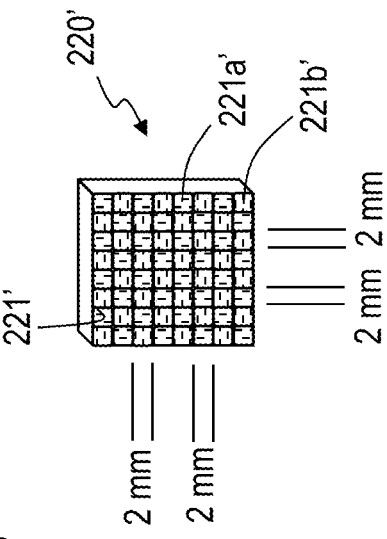
Figure 14B:
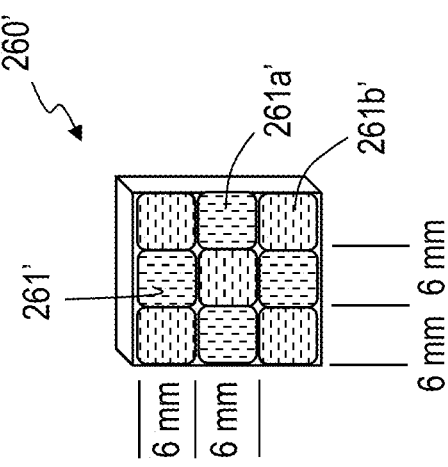
FIG. 14A and FIG. 14B are diagrams illustrating magnetized magnetic sheets.
Figure 14A:
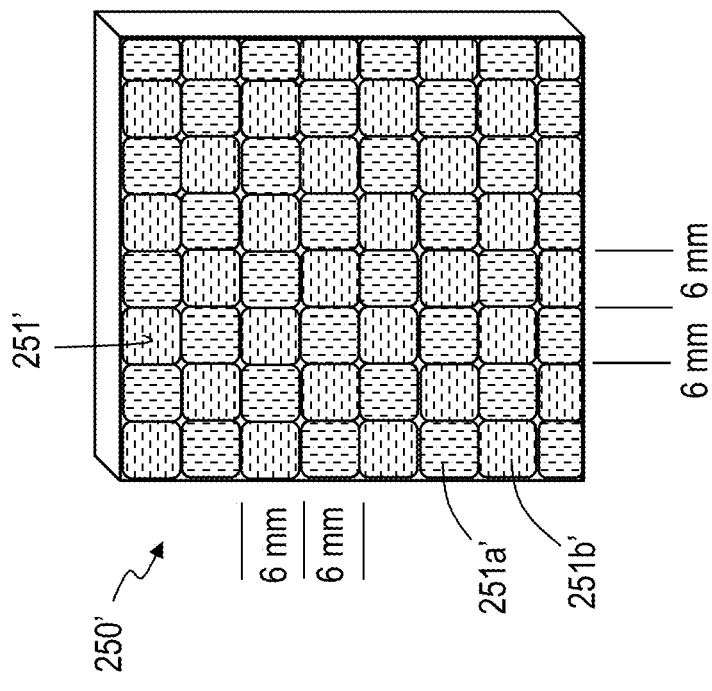

Other examples of the "first object" and the "second object" are described. FIG. 13A to FIG. 14B illustrate magnetic sheets which are magnetized with a texture including periodical nearly-checkered (nearly checker) regions magnetized to the S pole and periodical nearly-checkered regions magnetized to the N pole, as examples of the "first object" and the "second object". Magnetic sheets 210', 230', and 250' in FIG. 13A, FIG. 13C, and FIG. 14A are specific examples of the "first object" and magnetic sheets 220', 240' and 260' in FIG. 13B, FIG. 13D, and FIG. 14B are specific examples of the "second object". A nearly-checkered pattern means a checkered pattern or a pattern close to a checkered pattern. That is, the nearly-checkered pattern in the present embodiment includes not only a pattern (checkered pattern) in which squares (or rectangles) magnetized to the S pole and squares (or rectangles) magnetized to the N pole are periodically arranged in an alternate manner but also a pattern in which patterns similar to squares (or rectangles) magnetized to the S pole and patterns similar to squares (or rectangles) magnetized to the N pole are periodically arranged in an alternate manner. Examples of the pattern similar to a square (or a rectangle) include a pattern of a square (or a rectangle) with rounded corners, a circle, and an oval.

As illustrated in FIG. 13A, one surface 211' (first surface) of the magnetic sheet 210' (first object) is magnetized with a nearly-checkered texture (first texture) in which square regions 211a' having rounded corners and magnetized to the S pole and square regions 211b' having rounded corners and magnetized to the N pole are periodically repeated in an alternate manner. As illustrated in FIG. 13B, one surface 221' (second surface) of the magnetic sheet 220' (second object) is magnetized with a nearly-checkered texture (second texture) in which square regions 221a' having rounded corners and magnetized to the S pole and square regions 221b' having rounded corners and magnetized to the N pole are periodically repeated in an alternate manner. All pitches of patterns in the nearly-checkered patterns magnetizing the magnetic sheets 210' and 220' (the width of each of the patterns periodically and repeatedly arranged in an alternate manner) are 2 mm.

As illustrated in FIG. 13C, one surface 231' (first surface) of the magnetic sheet 230' (first object) is magnetized with a nearly-checkered texture (first texture) in which square regions 231a' having rounded corners and magnetized to the S pole and square regions 231b' having rounded corners and magnetized to the N pole are periodically repeated in an alternate manner. As illustrated in FIG. 13D, one surface 241' (second surface) of the magnetic sheet 240' (second object) is magnetized with a nearly-checkered texture (second texture) in which square regions 241a' having rounded corners and magnetized to the S pole and square regions 241b' having rounded corners and magnetized to the N pole are periodically repeated in an alternate manner. All pitches of patterns in the nearly-checkered patterns magnetizing the magnetic sheets 230' and 240' are 4 mm.

As illustrated in FIG. 14A, one surface 251' (first surface) of the magnetic sheet 250' (first object) is magnetized with a nearly-checkered texture (first texture) in which square regions 251a' having rounded corners and magnetized to the S pole and square regions 251b' having rounded corners and magnetized to the N pole are periodically repeated in an alternate manner. As illustrated in FIG. 14B, one surface 261' (second surface) of the magnetic sheet 260' (second object) is magnetized with a nearly-checkered texture (second texture) in which square regions 261a' having rounded corners and magnetized to the S pole and square regions 261b' having rounded corners and magnetized to the N pole are periodically repeated in an alternate manner. All pitches of patterns in the nearly-checkered patterns magnetizing the magnetic sheets 250' and 260' are 6 mm.

A user can perceive bumpiness by performing the operation for changing the relative positional relation between the "first surface" and the "second surface" or/and the action for changing the relative positional relation between the "first surface" and the "second surface" while keeping the "first surface" of the "first object" and the "second surface" in contact with or close to each other also when magnetic sheets magnetized with nearly-checkered textures described above are used as the "first object" and the "second object". The pitch of the "first object" and the pitch of the "second object" may be the same as or different from each other. Also, a magnetic sheet magnetized with a nearly-checkered texture may be used as the "first object" and a magnetic sheet magnetized with a texture in which belt-like regions are alternately repeated as described above may be used as the "second object". In an inverted manner, a magnetic sheet magnetized with a texture in which belt-like regions are alternately repeated as described above may be used as the "first object" and a magnetic sheet magnetized with a nearly-checkered texture may be used as the "second object".

Figure 16A:
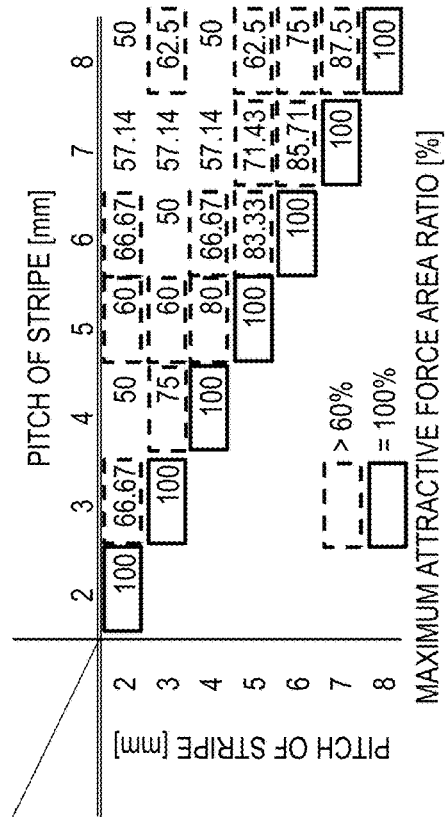
FIG. 16A and FIG. 16B respectively illustrate a relation between a pitch of a combination of magnetic sheets magnetized with stripe textures and holding force, and a relation between a pitch and an attractive force area ratio.
Figure 16B:
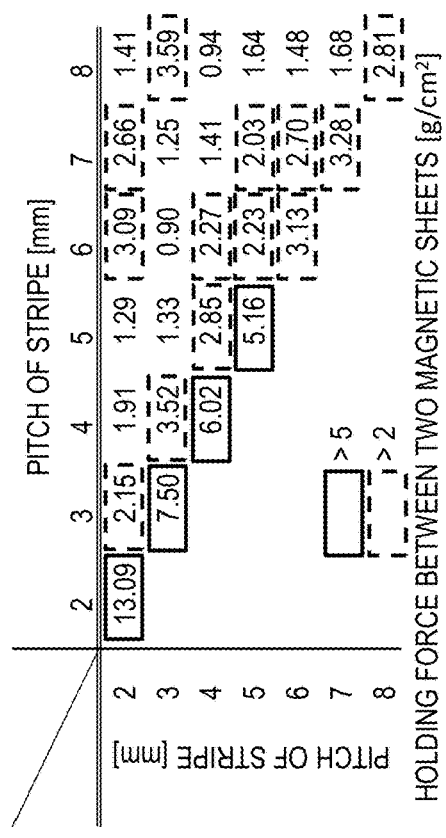
Figure 17B:
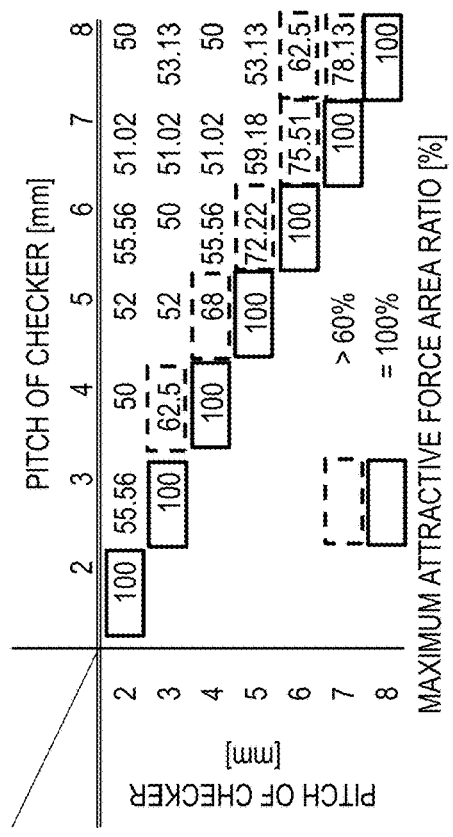
FIG. 17A and FIG. 17B respectively illustrate a relation between a pitch of a combination of magnetic sheets magnetized with checker textures and holding force, and a relation between a pitch and an attractive force area ratio.
Figure 17A:
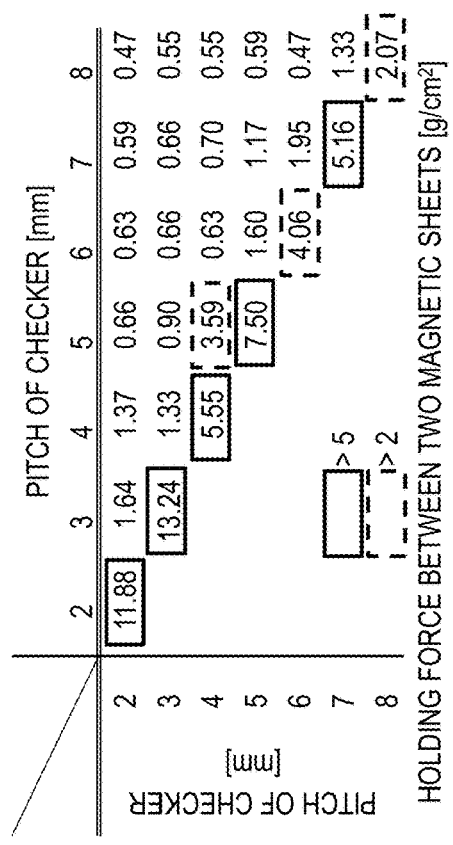

Pitches of magnetic sheets used as the "first object" and the "second object" affect shearing stress, that is, bumpy feeling perceived by a user when a magnetic sheet magnetized with a nearly-checkered texture as described above is used as at least one of the "first object" and the "second object". That is, a spatial frequency of shearing stress, that is, spacing of bumpiness perceived by a user depends on a smaller pitch between the pitch of a magnetic sheet used as the "first object" and the pitch of a magnetic sheet used as the "second object". Further, a magnitude of shearing stress, that is, a magnitude of bumpy feeling perceived by a user depends on a combination between the pitch of a magnetic sheet used as the "first object" and the pitch of a magnetic sheet used as the "second object". Also, the above-described formulation for a magnitude of perceived bumpy feeling is applicable also to the case where a magnetic sheet magnetized with a nearly-checkered texture is used as at least one of the "first object" and the "second object", and the magnitude $V_{(A,B)}$ of perceived bumpy feeling is expressed by Formula (3). However, the maximum attractive force area ratio between magnetic sheets is smaller and perceived bumpy feeling can be reduced when a magnetic sheet magnetized with a nearly-checkered texture is used as at least one of the "first object" and the "second object" compared to the case where magnetic sheets magnetized with a texture in which belt-like regions are alternately repeated as those described above are used as the "first object" and the "second object". For example, even in the use of the magnetic sheet having a 2-mm pitch and the magnetic sheet having a 6-mm pitch, 66.67% of maximum attractive force area ratio is obtained when a combination of magnetic sheets magnetized with textures in which belt-like regions are alternately repeated (stripe texture) is used, while 55.56% of maximum attractive force area ratio is obtained when a combination of magnetic sheets magnetized with nearly-checkered textures (checker texture) is used, as illustrated in FIG. 15. Further, even in the use of a combination of magnetic sheets magnetized with stripe textures or a combination of magnetic sheets magnetized with checker textures, holding force and the maximum attractive force area ratio between these magnetic sheets reach the maximum when the pitch of the magnetic sheet used as the "first object" and the pitch of the magnetic sheet used as the "second object" are equal to each other, as illustrated from FIG. 16A to FIG. 17B. Here, in the use of stripe textures, certain levels of holding force and maximum attractive force area ratios can be obtained even when the pitch of the magnetic sheet used as the "first object" and the pitch of the magnetic sheet used as the "second object" are different from each other (FIG. 16A and FIG. 16B). On the other hand, in the use of checker textures, holding force and maximum attractive force area ratios are largely lower when the pitch of the magnetic sheet used as the "first object" and the pitch of the magnetic sheet used as the "second object" are different from each other compared to the case where these pitches are the same as each other (FIG. 17A and FIG. 17B). That is, it is understood that a certain level of magnitude of bumpy feeling can be perceived even when pitches of two magnetic sheets are different from each other in the use of stripe textures, while the magnitude of perceived bumpy feeling is largely lowered when the pitches of two magnetic sheets are different from each other in the use of checker textures. Meanwhile, bumpy feeling can be perceived only when the relative position between the "first object" and the "second object" is changed in a one-dimensional direction in the use of stripe textures, while bumpy feeling can be perceived also when this relative position is changed in a two-dimensional direction in the use of checker textures.

<Characteristics of Present Embodiment>

In the present embodiment, use of two magnetic sheets enables perception of bumpy feeling and realizes expression of various kinds of bumpy feeling in accordance with textures magnetizing respective magnetic sheets and pitches.

[Modification of Second Embodiment]

If magnetic force sufficiently acts between a magnetic sheet used as the "first object" and a magnetic sheet used as the "second object", the relative positional relation between surfaces (first surface and second surface) of these magnetic sheets may be changed in a state that these two magnetic sheets are not in contact with each other. For example, a thin sheet made of a nonmagnetic body such as paper may be interposed between these two magnetic sheets. A user may be in contact with both of a magnetic sheet used as the "first object" and a magnetic sheet used as the "second object" or may be in contact only with the magnetic sheet used as the "first object".

Third Embodiment

The principles of the second embodiment are applied to a third embodiment. As described above, even though a texture magnetizing one magnetic sheet is unvaried, different kinds of bumpy feeling can be provided to a user if a texture magnetizing the other magnetic sheet to be layered on one magnetic sheet is varied. The present embodiment utilizes this characteristic. A force sense presenting object according to the present embodiment includes a "base object", a "first sheet", a "second sheet", a "first contact object", and a "second contact object". The "base object" includes a "first surface", and the "first surface" is preliminarily magnetized with a "first texture" including S-pole regions and N-pole regions. The "first sheet" is provided with a "first pattern", which is visually recognizable, and is layered on the "first surface" of the "base object". The "second sheet" is provided with a "second pattern", which is different from the "first pattern" and is visually recognizable, and is layered on the "first surface" of the "base object". The "first contact object" includes a "second surface", and the "second surface" is preliminarily magnetized with a "second texture" including S-pole regions and N-pole regions. The "second contact object" includes a "third surface", and the "third surface" is preliminarily magnetized with a "third texture" which includes S-pole regions and N-pole regions and is different from the "second texture". Here, bumpy feeling perceived by the "acting subject" from the "first contact object" when performing a "first action" and bumpy feeling perceived by the "acting subject" from the "second contact object" when performing a "second action" are different from each other. In other words, the way of change in shearing stress received by the "acting subject" from the "first contact object" when performing the "first action" and the way of change in shearing stress received by the "acting subject" from the "second contact object" when performing the "second action" are different from each other. Here, the "first action" means an action that the "acting subject" touches the "first contact object" and performs an operation for changing a relative positional relation between the "first surface" and the "second surface" or/and an action for changing the relative positional relation between the "first surface" and the "second surface" while keeping the "first surface" and the "second surface" close to each other when the "first sheet" is layered on the "first surface" of the "base object". The "second action" means an action that the "acting subject" touches the "second contact object" and performs an operation for changing a relative positional relation between the "first surface" and the "third surface" or/and an action for changing the relative positional relation between the "first surface" and the "third surface" while keeping the "first surface" and the "third surface" close to each other when the "second sheet" is layered on the "first surface" of the "base object".

Specific examples of the present embodiment are described below with reference to the accompanying drawings.

Figure 19:
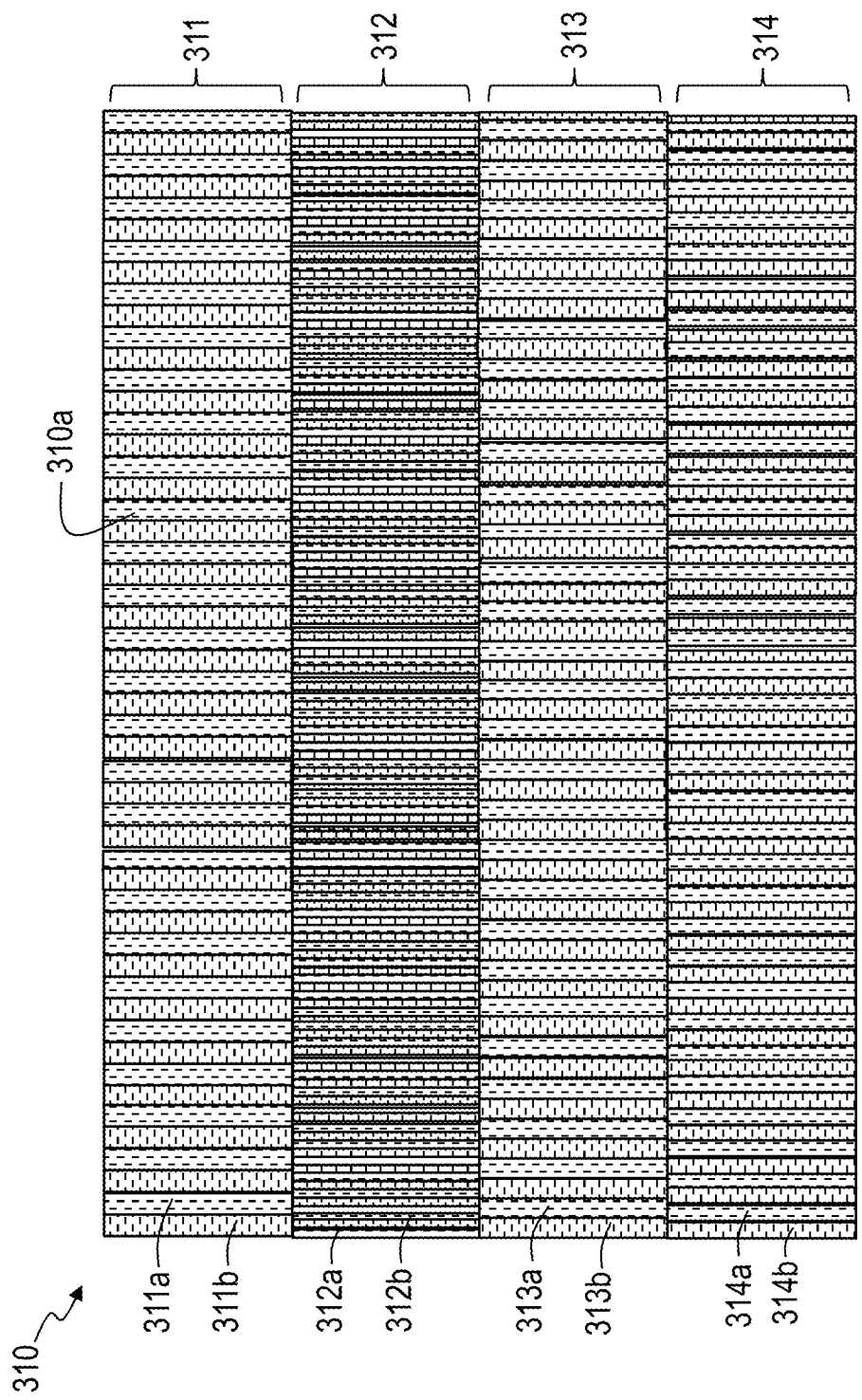
FIG. 19 is a diagram illustrating a base object.

FIG. 19 illustrates a base object 310 which is the "base object" of the present embodiment. The base object 310 of the present embodiment is a magnetic sheet and one surface 310a (first surface) of the base object 310 is preliminarily magnetized with a texture (first texture) including S-pole regions 311a, 312a, 313a, and 314a and N-pole regions 311b, 312b, 313b, and 314b. The surface 310a of the base object 310 is sectioned into four regions 311, 312, 313, and 314. The region 311 is magnetized so that the S-pole regions 311a having a belt-like shape and the N-pole regions 311b having a belt-like shape are periodically repeated in an alternate manner. The region 312 is magnetized so that the S-pole regions 312a having a belt-like shape and the N-pole regions 312b having a belt-like shape are periodically repeated in an alternate manner. The region 313 is magnetized so that the S-pole regions 313a having a belt-like shape and the N-pole regions 313b having a belt-like shape are periodically repeated in an alternate manner. The region 314 is magnetized so that the S-pole regions 314a having a belt-like shape and the N-pole regions 314b having a belt-like shape are periodically repeated in an alternate manner.

Figure 18A:
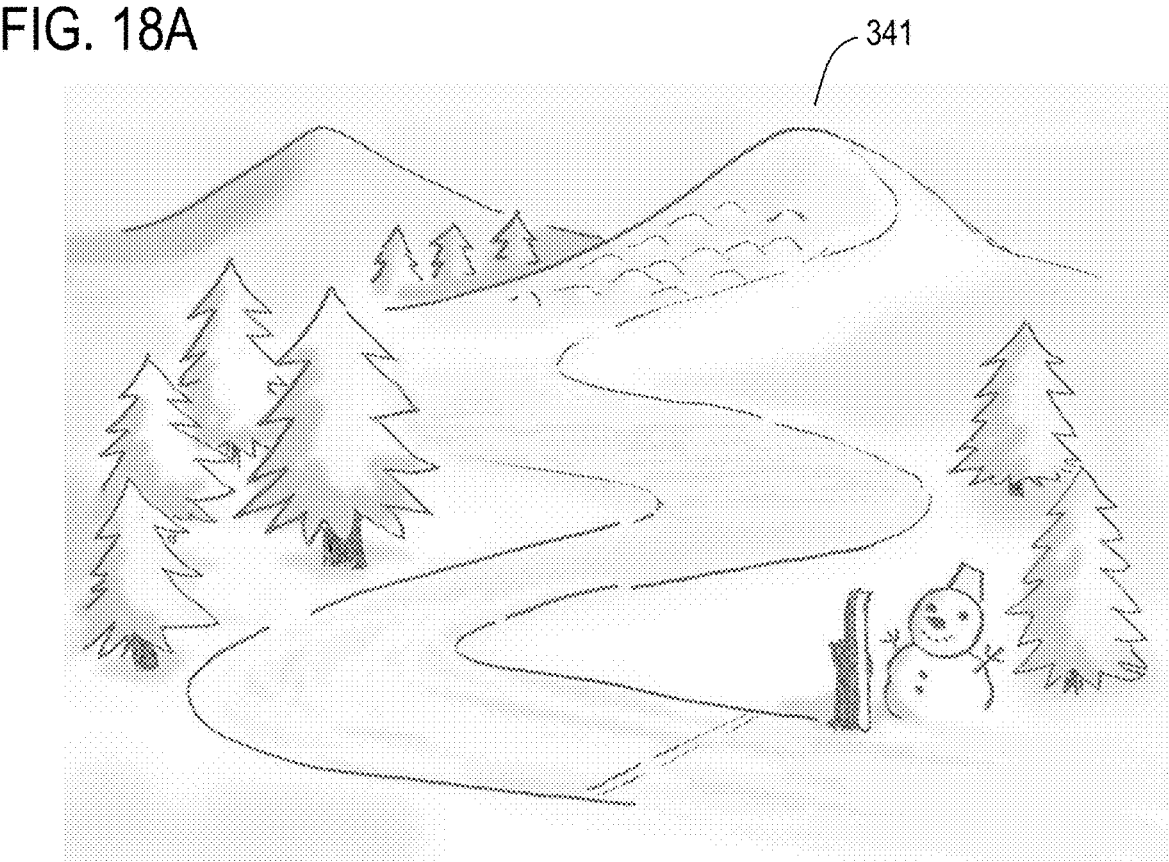
FIG. 18A and FIG. 18B are diagrams illustrating sheets to be layered on a base object.
Figure 18B:
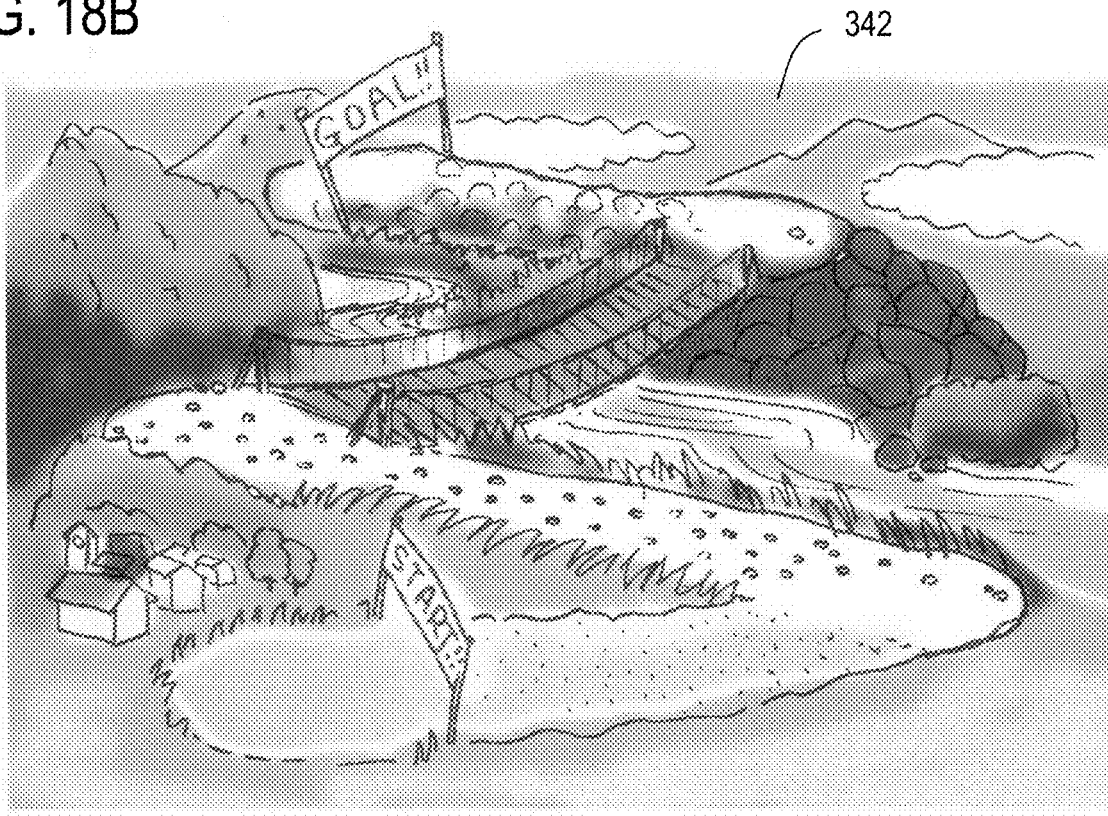

FIG. 18A illustrates a sheet 341 which is the "first sheet" of the present embodiment and FIG. 18B illustrates a sheet 342 which is the "second sheet" of the present embodiment. The sheets 341 and 342 are thin sheets made of a nonmagnetic body such as paper and synthetic resin. The sheets 341 and 342 may be made of an opaque material or may be made of a transparent material. One surface of the sheet 341 is provided with a visually-recognizable pattern (first pattern). One surface of the sheet 342 is provided with a visually-recognizable pattern (second pattern) which is different from the pattern (first pattern) of the sheet 341. On one surface of the sheet 341 illustrated in FIG. 18A and one surface of the sheet 342 illustrated in FIG. 18B, images which are different from each other (drawings and pictures, for example) are drawn. In this example, a ski area is expressed on the sheet 341 and an off-road course is expressed on the sheet 342. Each of the sheets 341 and 342 can be layered on the surface 310a of the base object 310.

Figure 20A:
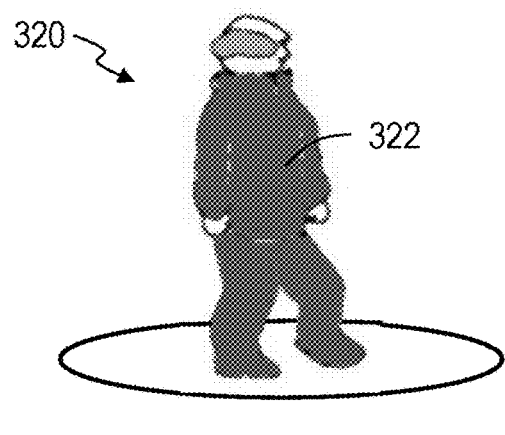
FIG. 20A to FIG. 20D are diagrams illustrating contact objects.
Figure 20B:
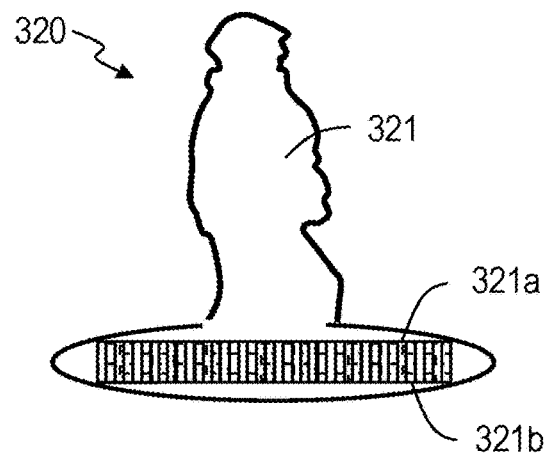

FIG. 20A and FIG. 20B illustrate a contact object 320 which is the "first contact object" of the present embodiment. The contact object 320 of the present embodiment is a magnetic sheet. An image (a drawing and a picture of a snowboarder, for example) is drawn on one surface 322 of the contact object 320. The other surface 321 (second surface) of the contact object 320 is preliminarily magnetized with a texture (second texture) including S-pole regions 321a and N-pole regions 321b. The surface 321 of the contact object 320 of the present embodiment is magnetized so that the S-pole regions 321a having a belt-like shape and the N-pole regions 321b having a belt-like shape are periodically repeated in an alternate manner.

Figure 20C:
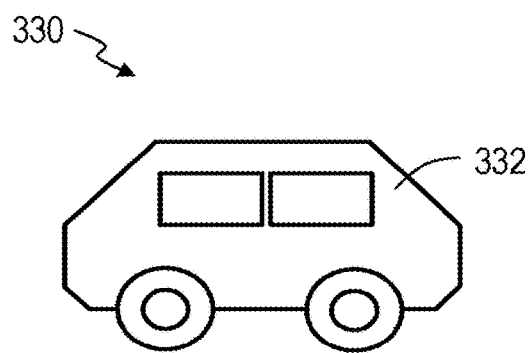
Figure 20D:
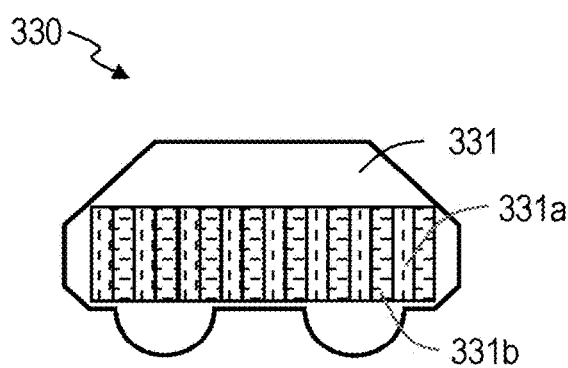

FIG. 20C and FIG. 20D illustrate a contact object 330 which is the "second contact object" of the present embodiment. The contact object 330 of the present embodiment is also a magnetic sheet. An image (a drawing and a picture of a car, for example) is drawn on one surface 332 of the contact object 330. The other surface 331 (third surface) of the contact object 330 is preliminarily magnetized with a texture (third texture) including S-pole regions 331a and N-pole regions 331b. The texture magnetizing the surface 331 of the contact object 330 is different from the texture magnetizing the surface 321 of the contact object 320. The surface 331 of the contact object 330 of the present embodiment is magnetized so that the S-pole regions 331*a* having a belt-like shape and the N-pole regions 331*b* having a belt-like shape are periodically repeated in an alternate manner. However, the pitch of the texture magnetizing the surface 331 is different from the pitch of the texture magnetizing the surface 321 of the contact object 320.

When the sheet 341 (first sheet) is layered on the surface 310*a* of the base object 310, the contact object 320 is further layered on the sheet 341. The sheet 341 is interposed between the contact object 320 and the base object 310 in a state that the surface 321 of the contact object 320 faces the sheet 341 side. A user (acting subject) touches the surface 322 of the contact object 320 with the finger or the like and performs an operation for changing a relative positional relation between the surface 310*a* (first surface) and the surface 321 (second surface) or/and an action for changing the relative positional relation between the surface 310*a* (first surface) and the surface 321 (second surface) while keeping the surface 310*a* (first surface) and the surface 321 (second surface) close to each other (first action). Accordingly, the user perceives bumpy feeling from the contact object 320. As described above, this bumpy feeling varies depending on a combination between a pattern, which is composed of the S-pole regions 321*a* and the N-pole regions 321*b* and magnetizes the surface 321 of the contact object 320, and a pattern, which is composed of the S-pole regions (any of the regions 311*a*, 312*a*, 313*a*, and 314*a*) and the N-pole regions (any of the regions 311*b*, 312*b*, 313*b*, and 314*b*) and magnetizes the region (any of the regions 311, 312, 313, and 314) of the surface 310*a* of the base object 310, which is close to the pattern composed of the S-pole regions 321*a* and the N-pole regions 321*b*.

Meanwhile, when the sheet 342 (second sheet) is layered on the surface 310*a* of the base object 310, the contact object 330 is further layered on the sheet 342. The sheet 342 is interposed between the contact object 330 and the base object 310 in a state that the surface 331 of the contact object 330 faces the sheet 342 side. A user (acting subject) touches the surface 332 of the contact object 330 with the finger or the like and performs an operation for changing a relative positional relation between the surface 310*a* (first surface) and the surface 331 (third surface) or/and an action for changing the relative positional relation between the surface 310*a* (first surface) and the surface 331 (third surface) while keeping the surface 310*a* (first surface) and the surface 331 (third surface) close to each other (second action). Accordingly, the user perceives bumpy feeling from the contact object 330. As described above, this bumpy feeling also varies depending on a combination between a pattern, which is composed of the S-pole regions 331*a* and the N-pole regions 331*b* and magnetizes the surface 331 of the contact object 330, and a pattern, which is composed of the S-pole regions (any of the regions 311*a*, 312*a*, 313*a*, and 314*a*) and the N-pole regions (any of the regions 311*b*, 312*b*, 313*b*, and 314*b*) and magnetizes the region (any of the regions 311, 312, 313, and 314) of the surface 310*a* of the base object 310, which is close to the pattern composed of the S-pole regions 331*a* and the N-pole regions 331*b*.

Further, the texture including the S-pole regions 321*a* and the N-pole regions 321*b* which are magnetized on the surface 321 of the contact object 320 and the texture including the S-pole regions 331*a* and the N-pole regions 331*b* which are magnetized on the surface 331 of the contact object 330 are different from each other. Therefore, bumpy feeling perceived by a user performing the "first action" when the texture including the regions 321*a* and 321*b* which are magnetized on the contact object 320 is close to any region α (any of the regions 311, 312, 313, and 314) of the surface 310*a* of the base object 310 and bumpy feeling perceived by the user performing the "second action" when the texture including the regions 331*a* and 331*b* which are magnetized on the contact object 330 is close to the same region α are different from each other. This is because the way of change in shearing stress received from the contact object 320 by a user performing the "first action" when the texture including the regions 321*a* and 321*b* which are magnetized on the contact object 320 is close to the region α and the way of change in shearing stress received from the contact object 330 by the user performing the "second action" when the texture including the regions 331*a* and 331*b* which are magnetized on the contact object 330 is close to the same region α are different from each other, as described above.

<Characteristics of Present Embodiment>

As described above, different kinds of bumpy feeling can be presented to a user depending on whether to use the contact object 320 or the contact object 330 even when the base object 310 is used for both cases. For example, magnitude or a pitch (spacing of perceived bumpiness) of bumpy feeling can be varied and regions on which bumpy feeling is not perceived can be varied depending on whether to use the contact object 320 or the contact object 330. Thus, mutually-different images corresponding mutually-different bumpy feeling are drawn on the sheet 341 and sheet 342 respectively, enabling perception of mutually-different bumpy feeling which respectively correspond to the mutually-different images drawn on the sheet 341 and the sheet 342. Thus, bumpy feeling can be changed depending on an image expressed on a sheet even though only a permanent magnet is used in the present embodiment. This technique is applicable to picture books presenting different kinds of bumpy feeling depending on a sheet.

[Modification of Third Embodiment]

The "first texture" magnetized on the "first surface" of the "base object" may be a "checker texture" which includes periodical nearly-checkered regions magnetized to the S pole and periodical nearly-checkered regions magnetized to the N pole. In the same manner, the "second texture" magnetizing the "second surface" of the "first contact object" may be the "checker texture" and the "third texture" magnetizing the "third surface" of the "second contact object" may be the "checker texture".

Figure 21A:
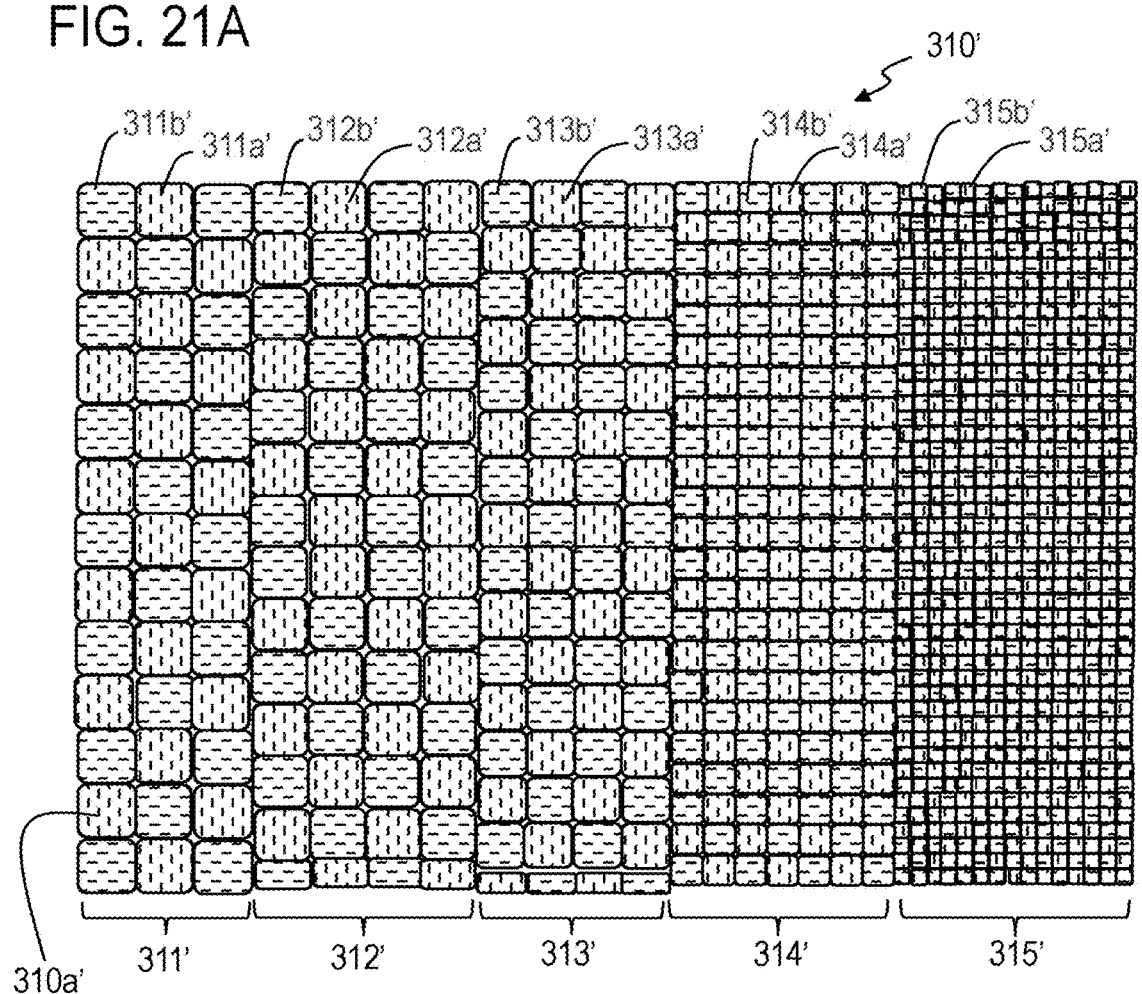
FIG. 21A to FIG. 21C are diagrams illustrating contact objects.
Figure 21B:
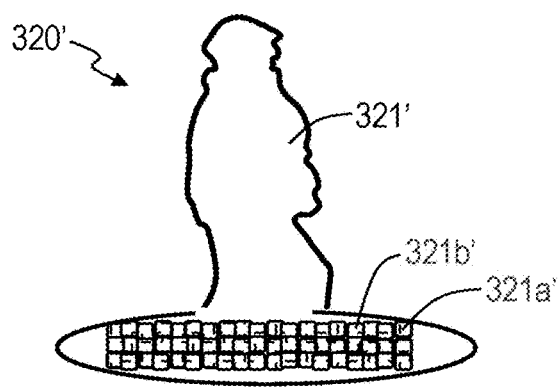
Figure 21C:
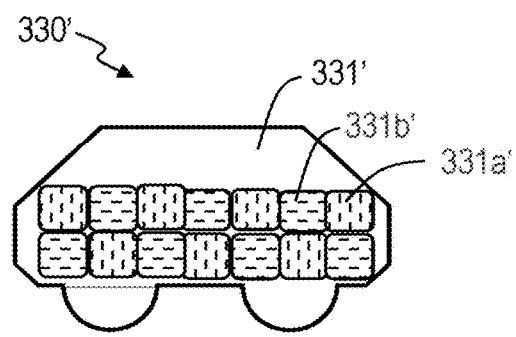

For example, a base object 310' illustrated in FIG. 21A may be used instead of the base object 310 described above, a contact object 320' illustrated in FIG. 21B may be used instead of the contact object 320, and a contact object 330' illustrated in FIG. 21C may be used instead of the contact object 330.

The base object 310' is a magnetic sheet and one surface 310*a*' (first surface) of the base object 310' is preliminarily magnetized with a periodical nearly-checkered texture (first texture) including S-pole regions 311*a*', 312*a*', 313*a*', 314*a*', and 315*a*' and N-pole regions 311*b*', 312*b*', 313*b*', 314*b*', and 315*b*'. The surface 310*a*' of the base object 310' is sectioned into five regions 311', 312', 313', 314', and 315'. The region 311' is magnetized with a periodical nearly-checkered texture composed of the S-pole regions 311*a*' and the N-pole regions 311*b*'. The region 312' is magnetized with a periodical nearly-checkered texture composed of the S-pole regions 312*a*' and the N-pole regions 312*b*'. The region 313' is magnetized with a periodical nearly-checkered texture composed of the S-pole regions 313a' and the N-pole regions 313b'. The region 314' is magnetized with a periodical nearly-checkered texture composed of the S-pole regions 314a' and the N-pole regions 314b'. The region 315' is magnetized with a periodical nearly-checkered texture composed of the S-pole regions 315a' and the N-pole regions 315b'.

The contact object 320' is a magnetic sheet. An image is drawn on one surface of the contact object 320' and the other surface 321' (second surface) is preliminarily magnetized with a periodical nearly-checkered texture (second texture) composed of S-pole regions 321a' and N-pole regions 321b'. The contact object 330' is a magnetic sheet. An image is drawn on one surface of the contact object 330' and the other surface 331' (third surface) is preliminarily magnetized with a periodical nearly-checkered texture (third texture) composed of S-pole regions 331a' and N-pole regions 331b'.

Figure 22B:
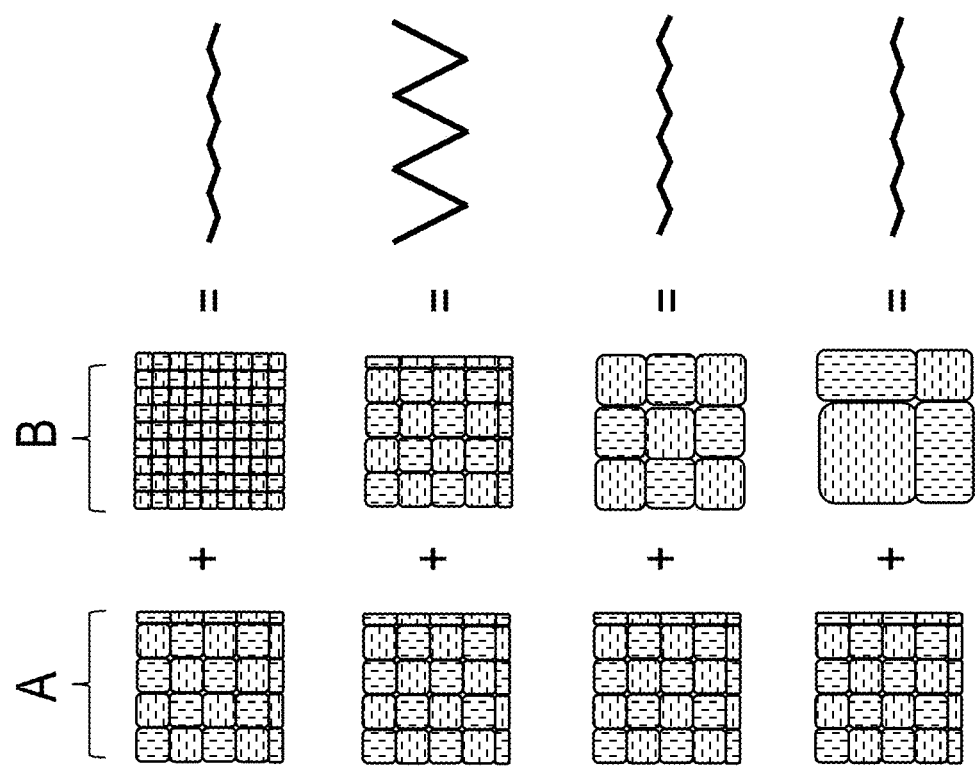
FIG. 22A and FIG. 22B are diagrams illustrating a relation of an attractive force area ratio between two magnetic sheets.
Figure 22A:
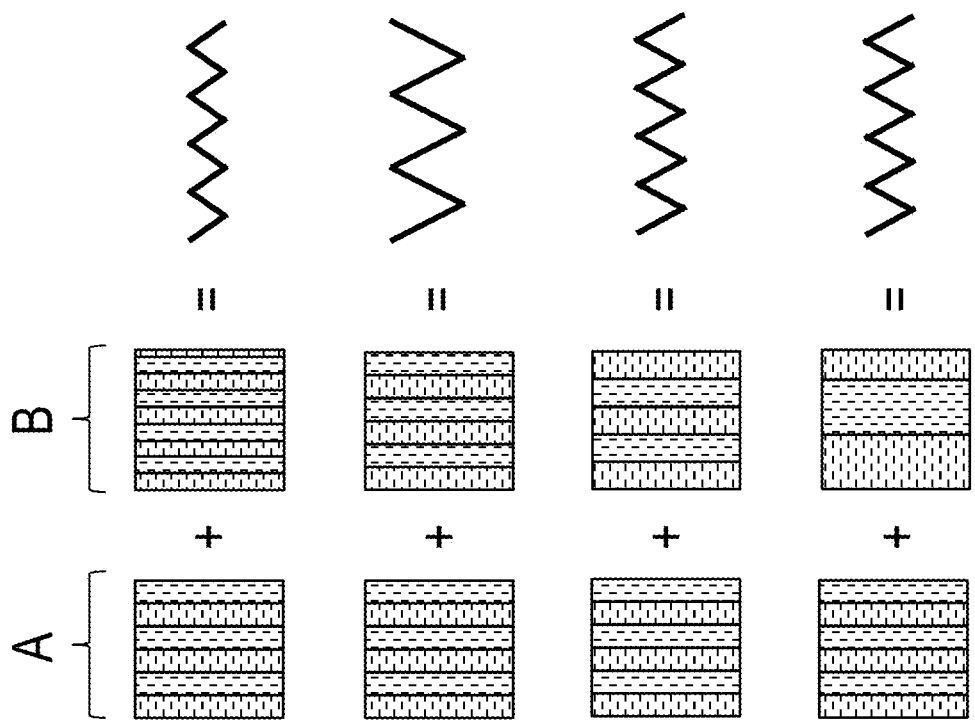

Similar advantageous effects to those of the third embodiment can be obtained also in this configuration. However, as described in the second embodiment, the magnitude of shearing stress perceived by a user, that is, the magnitude of bumpy feeling is smaller if the base object 310', the contact object 320', and the contact object 330' which are magnetized with checker textures is used instead of any of the base object 310, the contact object 320, and the contact object 330. As illustrated in FIG. 22A, in the use of the base object A and the contact object B which are magnetized with stripe textures, the magnitude of bumpy feeling perceived by a user reaches the maximum when the pitches of the textures are the same as each other, and even when the pitches of the textures are not the same as each other, there is a combination by which shearing stress perceived by the user is large to some extent and the user perceives a certain magnitude of bumpy feeling. On the other hand, as illustrated in FIG. 22B, in the use of the base object A and the contact object B which are magnetized with checker textures, the magnitude of bumpy feeling perceived by a user reaches the maximum when the pitches of the textures are the same as each other, and when the pitches of the textures are not the same as each other, shearing stress perceived by the user is small and almost no bumpy feeling is perceived. That is, a region in which bumpy feeling is perceived can be limited in the use of the base object A and the contact object B which are magnetized with checker textures.

Fourth Embodiment

The principles of the second embodiment are applied also in a fourth embodiment. The present embodiment describes a "force sense presenting object" in which the principle of the second embodiment is incorporated in an input device and which presents bumpy feeling to a user in information input, without using any electromagnet.

When the input device is a touch panel, the "force sense presenting object" includes a "first object" which is disposed on an input surface of the touch panel and a "second object" which is attached, gripped, or supported by an "acting subject" performing an input operation with respect to the touch panel. The "first object" includes a "first surface", and the "first surface" is preliminarily magnetized with a "first texture" including S-pole regions and N-pole regions. The "second object" includes a "second surface", and the "second surface" is preliminarily magnetized with a "second texture" including S-pole regions and N-pole regions. The "first object" is a magnetic sheet which is disposed with one plate surface thereof facing an input surface side of the touch panel and the "first surface" is the other plate surface of the magnetic sheet, for example. An "acting subject" who performs an input operation with respect to the touch panel having an input surface on which the "first object" is disposed wears, grips, or supports the "second object" and performs an operation for changing a relative positional relation between the "first surface" and the "second surface" and/or an action for changing the relative positional relation between the first surface and the second surface while keeping the "first surface" and the "second surface" in contact with or close to each other. Thus, the input operation with respect to the touch panel is performed and the "acting subject" perceives bumpy feeling. That is, through such an action performed by an "acting subject", the input operation with respect to the touch panel is performed and shearing stress received by the "acting subject" from the second object periodically varies. Accordingly, the "acting subject" perceives bumpy feeling.

When the input device is an input device such as a computer mouse, a "force sense presenting object" includes a "first object" and a "second object". The "first object" includes a "first surface", and the "first surface" is preliminarily magnetized with a "first texture" including S-pole regions and N-pole regions. The "second object" includes a "second surface", and the "second surface" is preliminarily magnetized with a "second texture" including S-pole regions and N-pole regions. The "second object" is attached or provided to the "input device" gripped by an "acting subject". An acting subject who operates the "input device" to which the "second object" is attached or provided performs an operation for changing a relative positional relation between the "first surface" and the "second surface" and/or an action for changing the relative positional relation between the "first surface" and the "second surface" while keeping the "first surface" and the "second surface" in contact with or close to each other. Thus, the input operation with respect to the "input device" is performed and the "acting subject" perceives bumpy feeling. That is, through such an action performed by an "acting subject", the input operation with respect to the input device is performed and shearing stress received by the acting subject from the input device periodically varies. Accordingly, the acting subject perceives bumpy feeling.

Specific examples of the present embodiment are described below with reference to the accompanying drawings.

<Case where Input Device is Touch Panel>

Figure 23:
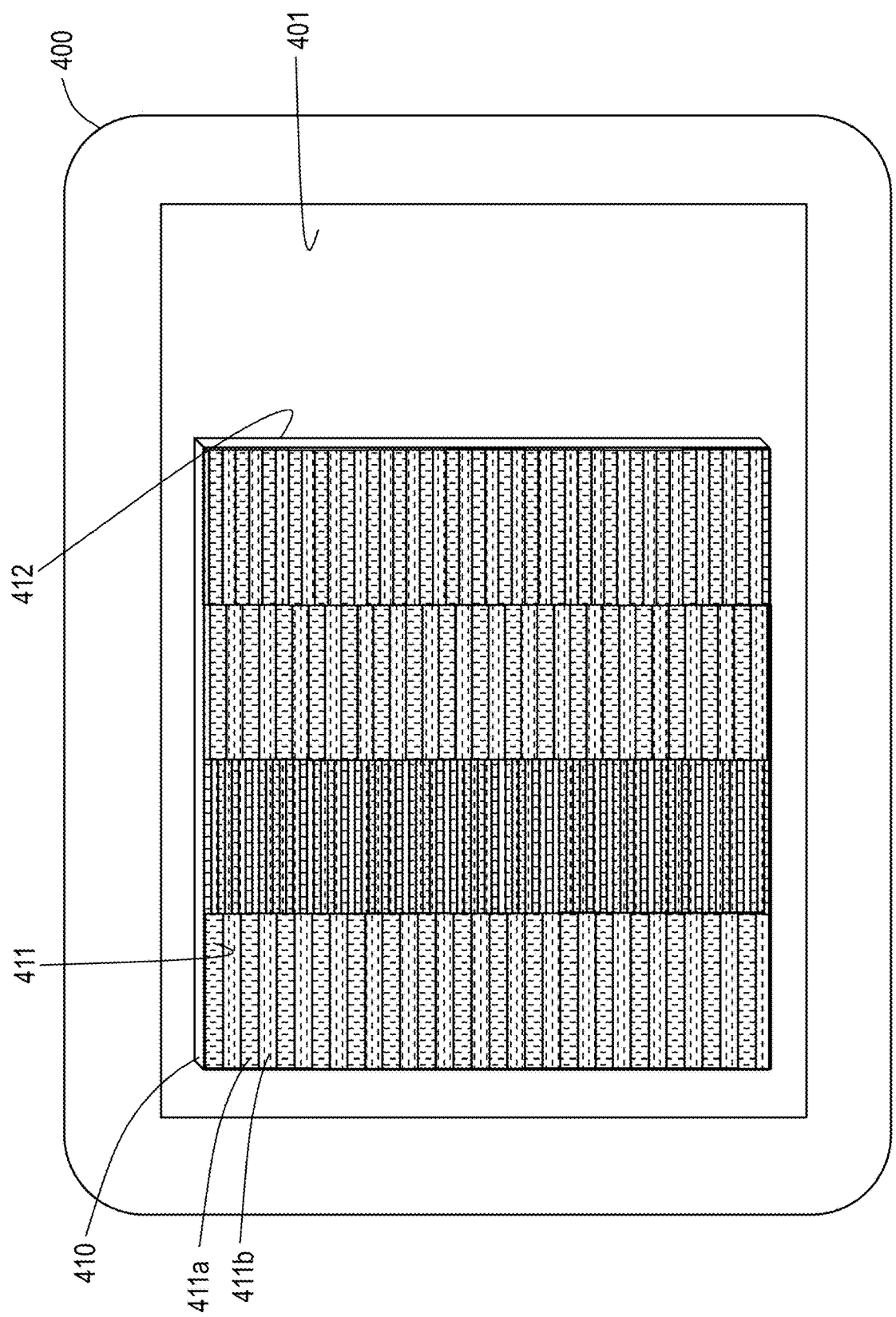
FIG. 23 is a diagram illustrating an input device according to an embodiment.

FIG. 23 and FIG. 24 illustrate an example in which the principle of the second embodiment is incorporated into a touch panel.

As illustrated in FIG. 23, a magnetic sheet 410 which is the "first object" is attached to an input surface (front surface) of a touch panel 401 of an electronic apparatus 400 such as a smartphone and a tablet device. One plate surface 412 of the magnetic sheet 410 is disposed to face an input surface side of the touch panel 401 and the other plate surface 411 (first surface) of the magnetic sheet 410 is preliminarily magnetized with a texture (first texture) including S-pole regions 411a and N-pole regions 411b. Here, the "first texture" may include a plurality of regions whose pitches and patterns (a stripe texture and a checker texture, for example) are mutually different.

A "second object" illustrated in FIG. 24A is a glove 420 which is worn, gripped, or supported by a user and front surfaces 421 (second surface) on pads of fingers of the user are preliminarily magnetized with a texture (second texture) including S-pole regions 421a and N-pole regions 421b. Here, the second texture may include a plurality of regions whose pitches and patterns (a stripe texture and a checker texture, for example) are mutually different. Respective fingers are magnetized with textures whose pitches and patterns are different from each other in FIG. 24A.

A user wears, grips, or supports the glove 420 and rubs the magnetic sheet 410 disposed on the input surface of the touch panel 401 of the electronic apparatus 400 by the texture part including the S-pole regions 421a and the N-pole regions 421b. Accordingly, an operation for changing a relative positional relation between the plate surface 411 (first surface) of the magnetic sheet 410 and the front surface 421 (second surface) on balls of fingers of the glove 420 or/and an action for changing the relative positional relation between the plate surface 411 (first surface) and the front surface 421 (second surface) is/are performed while keeping the plate surface 411 (first surface) and the front surface 421 (second surface) in contact with or close to each other. Thus, the input operation with respect to the touch panel is performed and a user perceives bumpy feeling. An image (a video, a moving image, and a picture image, for example) may be displayed from the touch panel 401 (output device) or sound may be outputted from a speaker (output device) of the electronic apparatus 400 in response to this input operation. Thus, force sense can be presented and presented contents of an image and/or sound can be changed in response to an input operation. In the glove 420 illustrated in FIG. 24A, respective fingers are magnetized with textures whose pitches and patterns are mutually different, realizing perception of different bumpy feeling depending on a finger operating the touch panel 401. Further, when a plurality of regions whose pitches and patterns are mutually different are provided on the plate surface 411 (first surface) of the magnetic sheet 410, a user can be allowed to perceive different bumpy feeling depending on a finger used for operation and a region operated.

A stylus pen 430 illustrated in FIG. 24B and FIG. 24C may be used as the "second object". The stylus pen 430 includes a gripping part 435 having a substantially columnar shape and an end part 436 having a substantially discoid shape. One end of the gripping part 435 is fixed or integrated around the center of one surface 432 of the end part 436. The other surface 431 (second surface) of the end part 436 is preliminarily magnetized with a texture (second texture) including S-pole regions 531a and N-pole regions 531b. A user grips or supports the gripping part 435 of the stylus pen 430 and rubs the magnetic sheet 410 disposed on the input surface of the touch panel 401 of the electronic apparatus 400 on the surface 431 side of the end part 436. Accordingly, an operation for changing a relative positional relation between the plate surface 411 (first surface) of the magnetic sheet 410 and the surface 431 (second surface) of the end part 436 or/and an action for changing the relative positional relation between the plate surface 411 (first surface) and the surface 431 (second surface) is/are performed while keeping the plate surface 411 (first surface) and the surface 431 (second surface) in contact with or close to each other. Thus, the input operation with respect to the touch panel 401 is performed and a user perceives bumpy feeling. An image may be displayed from the touch panel 401 (output device) or sound may be outputted from the speaker (output device) of the electronic apparatus 400 in response to this input operation. Accordingly, force sense can be presented and presented contents of an image and/or sound can be changed in response to an input operation.

Figure 25:
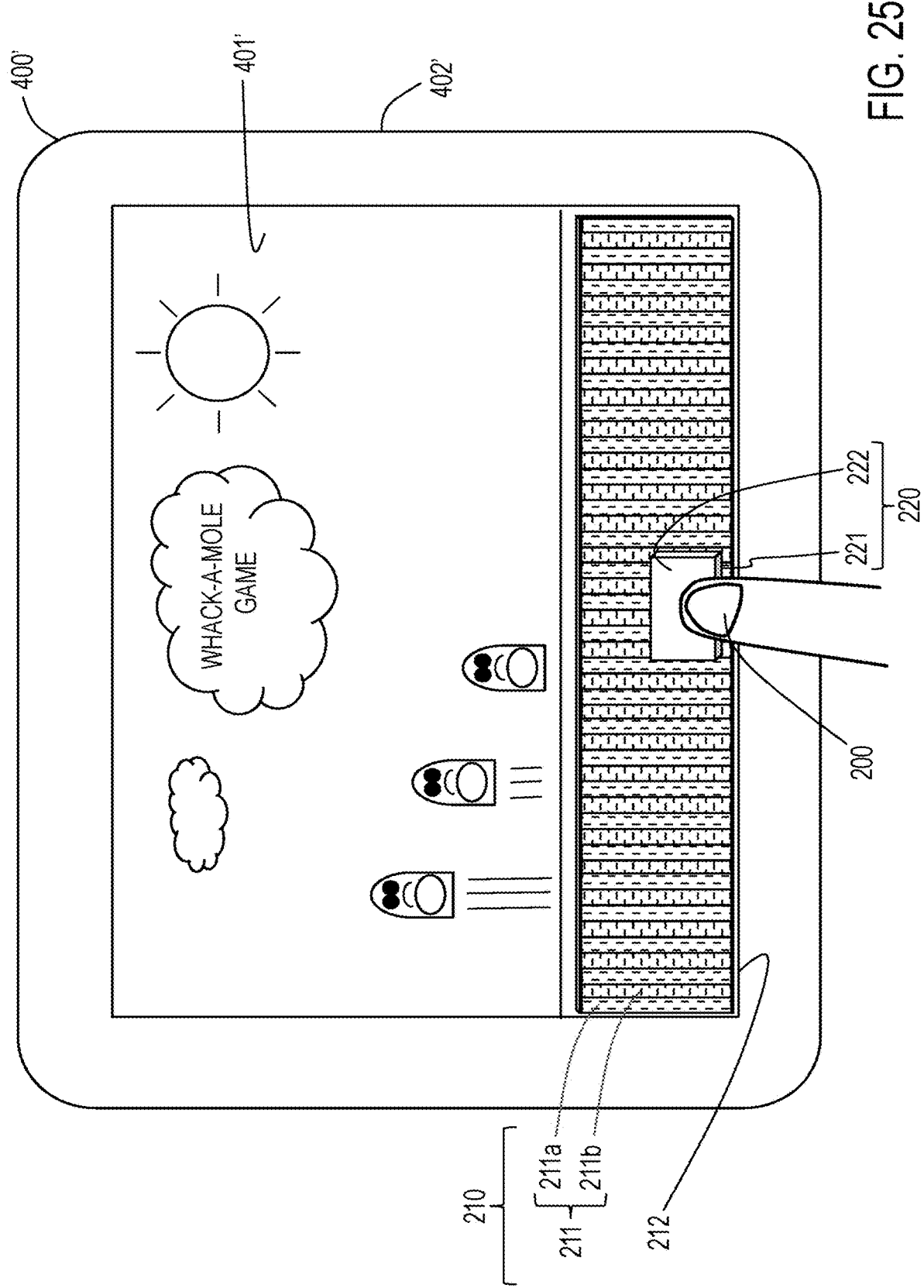
FIG. 25 is a diagram illustrating an input device according to the embodiment.

FIG. 25 illustrates an example in which force sense is presented and game contents are presented in response to an input operation. As illustrated in FIG. 25, the magnetic sheet 210 illustrated in the second embodiment is attached to a lower part of an input surface (front surface) of a touch panel 401' of an electronic apparatus 400' such as a smartphone and a tablet device. One plate surface 212 of the magnetic sheet 210 is disposed to face an input surface side of the touch panel 401' and the other plate surface 211 (first surface) of the magnetic sheet 210 is preliminarily magnetized with a texture (first texture) including S-pole regions 211a and N-pole regions 211b. The magnetic sheet 220 illustrated in the second embodiment is disposed on the plate surface 211 of the magnetic sheet 210. One surface 221 (second surface) of the magnetic sheet 220 is magnetized with a texture (second texture) including S-pole regions 221a and N-pole regions 221b and the magnetic sheet 220 is disposed so that the surface 221 faces the plate surface 211. A user touches the other surface 222 of the magnetic sheet 220 layered on the magnetic sheet 210 with a finger 200 and performs an operation for changing a relative positional relation between the surface 211 and the surface 221 while keeping the surface 211 and the surface 221 in contact with or close (nearly contact) to each other. Thus, the input operation with respect to the touch panel 401' is performed and the user perceives bumpy feeling. Presented contents of game contents on the touch panel 401' (output device) are changed and sound outputted from a speaker 402' (output device) of the electronic apparatus 400' is changed in response to this input operation.

<Case where Input Device is Computer Mouse and so On>

Figure 26C:
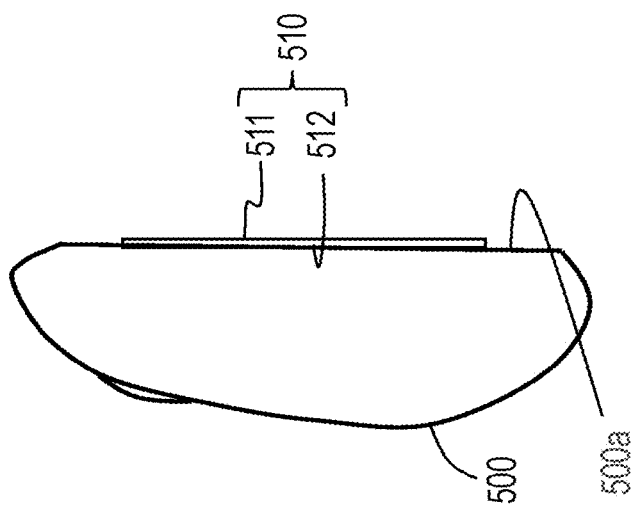
FIG. 26A to FIG. 26C are diagrams illustrating an input device according to the embodiment.
Figure 26B:
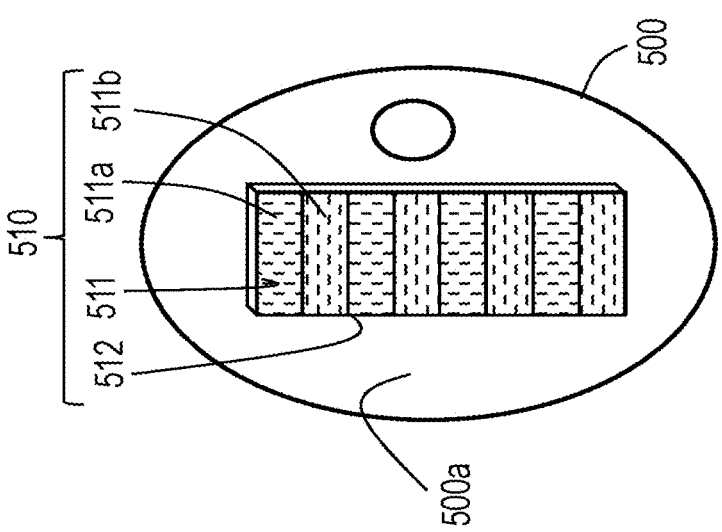
Figure 26A:
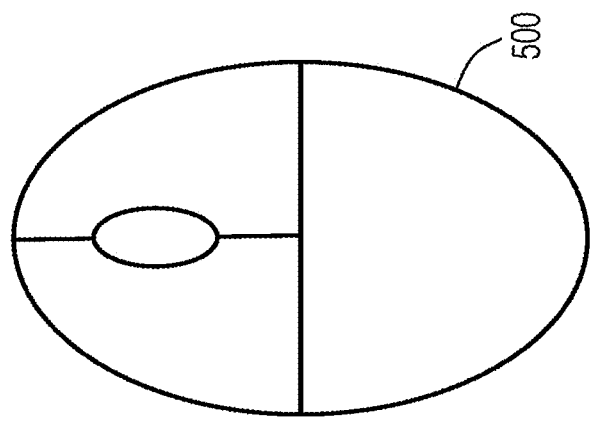

FIG. 26A to FIG. 26C illustrate an example in which the principle of the second embodiment is incorporated into a computer mouse 500. A magnetic sheet 510 which is the "second object" is fixed on a bottom surface 500a of the computer mouse 500. One surface 511 (second surface) of the magnetic sheet 510 is preliminarily magnetized with a "second texture" including S-pole regions 511a and N-pole regions 511b. The "second texture" is a stripe texture and a checker texture, for example. The other surface 512 of the magnetic sheet 510 is fixed on the bottom surface 500a of the computer mouse 500.

The magnetic sheets 210, 230, 250, 210', 230', and 250', and the base objects 310 and 310', for example, can be used as the "first object". When the magnetic sheet 210 is used as the "first object", for example, a user (acting subject) disposes the magnetic sheet 210 so that the surface 211 (first surface) faces upward and grips the computer mouse 500 so that the surface 511 (second surface) of the magnetic sheet 510 fixed to the computer mouse 500 is brought into contact with the surface 211.

The user slides the computer mouse 500 along the surface 211 (first surface) of the magnetic sheet 210 so as to change a relative positional relation between the surface 211 (first surface) and the surface 511 (second surface) while keeping the surface 211 (first surface) and the surface 511 (second surface) in contact with or close to each other. Thus, the input operation with respect to the computer mouse 500 is performed and the user perceives bumpy feeling. An image may be displayed from a display (output device), which is not shown, a video may be projected from a projector (output device), or sound may be outputted from a speaker (output device) in response to this input operation. Accordingly, force sense can be presented and presented contents of an image and/or sound can be changed in response to an input operation.

<Characteristics of Present Embodiment>

In the present embodiment, a user performing information input can be allowed to perceive bumpy feeling when he/she performs the information input into an input device.

Fifth Embodiment

The principles of the second embodiment are applied in a fifth embodiment as well. In the fifth embodiment, a first object is fixed on a walking surface and bumpy feeling is presented when an acting subject wearing or gripping a second object moves, providing tactile information similar to a braille paving tile to a pedestrian. The "first object" of the present embodiment can be fixed on a walking surface in a state that a "first surface" faces upward and the "second object" is a member that can be worn or gripped by an "acting subject" in a state that a "second surface" faces outside. Here, the "first object" includes the "first surface", and the "first surface" is magnetized with a "first texture" including S-pole regions and N-pole regions; and the "second object" includes the "second surface", and the "second surface" is magnetized with a "second texture" including S-pole regions and N-pole regions, as described above. The "acting subject" wearing or gripping the "second object" walks on the "first surface" of the "first object" fixed on a walking surface while keeping the "first surface" and the "second surface" in contact with or close to each other and thus changes a relative positional relation between the "first surface" and the "second surface", perceiving bumpiness.

A specific example of the present embodiment is described below with reference to the accompanying drawings.

Figure 27:
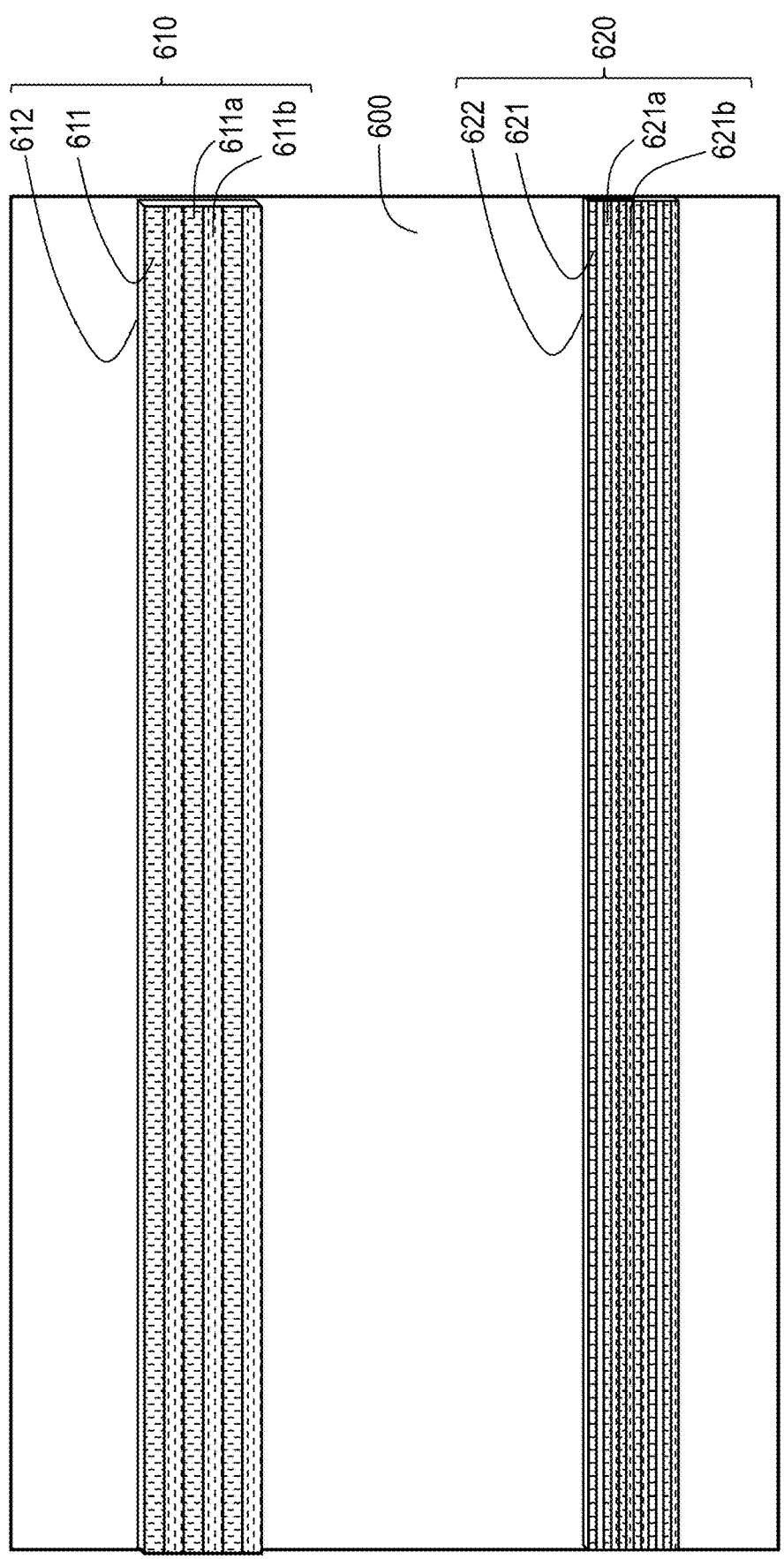
FIG. 27 is a diagram illustrating a magnetic braille paving tile according to an embodiment.

FIG. 27 illustrates magnetic sheets 610 and 620 which are the "first object" according to the present embodiment. One surface 611 (first surface) of a magnetic sheet 610 is magnetized with a texture (first texture) including S-pole regions 611a and N-pole regions 611b. The surface 611 (first surface) of the magnetic sheet 610 faces upward and the other surface 612 of the magnetic sheet 610 is fixed on a floor 600 (walking surface). In a similar manner, one surface 621 (first surface) of the magnetic sheet 620 is magnetized with a texture (first texture) including S-pole regions 621a and N-pole regions 621b. The surface 621 (first surface) of the magnetic sheet 620 faces upward and the other surface 622 of the magnetic sheet 620 is fixed on the floor 600 (walking surface). Though the surfaces 611 and 621 are magnetized with stripe textures in FIG. 27, the surfaces 611 and 621 may be magnetized with checker textures.

Figure 28B:
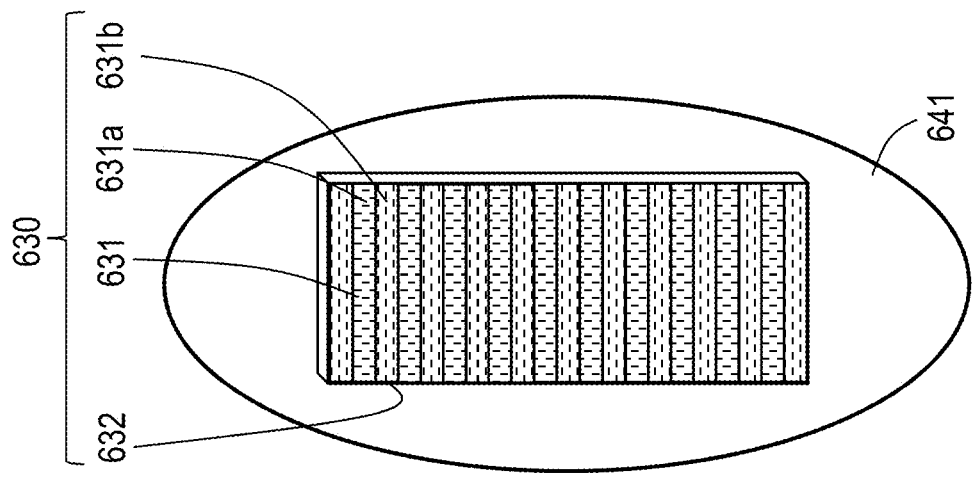
FIG. 28A and FIG. 28B are diagrams illustrating a shoe for magnetic braille paving tiles according to the embodiment.
Figure 28A:
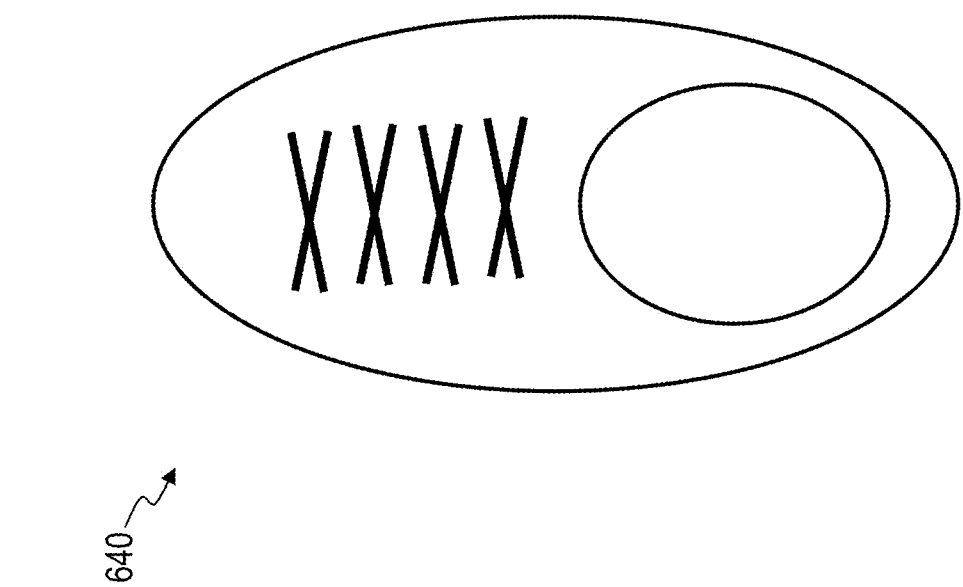

FIG. 28A and FIG. 28B illustrate a shoe 640 which is the "second object" of the present embodiment. One surface 632 of a magnetic sheet 630 is fixed on a shoe sole 641 (second surface) of the shoe 640. The other surface 631 of the magnetic sheet 630 is magnetized with a texture (second texture) including S-pole regions 631a and N-pole regions 631b. Needless to say, a pedestrian (acting subject) can wear the shoe 640 in a state that the shoe sole 641 faces outside.

A pedestrian wearing the shoe 640 walks on the surface 611 or 621 (first surface) of the magnetic sheet 610 or 620 fixed on the floor 600 (walking surface) while keeping the surface 611 or 621 (first surface) of the magnetic sheet 610 or 620 and the shoe sole 641 (second surface) in contact with or close to each other and thus changes a relative positional relation between the surface 611 or 621 (first surface) and the shoe sole 641 (second surface), perceiving bumpiness.

FIG. 29A and FIG. 29B illustrate a white cane 650 which is another example of the "second object". The white cane 650 includes a gripping part 655 having a substantially columnar shape and an end part 656 having a substantially discoid shape. One end of the gripping part 655 is fixed or integrated around the center of one surface 652 of the end part 656. The other surface 651 (second surface) of the end part 656 is preliminarily magnetized with a texture (second texture) including S-pole regions 651a and N-pole regions 651b. A pedestrian gripping the white cane 650 walks on the surface 611 or 621 (first surface) of the magnetic sheet 610 or 620 fixed on the floor 600 (walking surface) while keeping the surface 611 or 621 (first surface) of the magnetic sheet 610 or 620 and the surface 651 (second surface) of the end part 656 of the white cane 650 in contact with or close to each other and thus changes a relative positional relation between the surface 611 or 621 (first surface) and the surface 651 (second surface), perceiving bumpiness.

<Characteristics of Present Embodiment>

In the present embodiment, a pedestrian can be allowed to perceive bumpy feeling without providing physical bumpiness on the floor 600. Physical bumpiness does not have to be provided on the floor 600, providing an advantage that dirt or dust is hardly collected on the floor 600. Further, the way of change in shearing stress received from the shoe sole 641 or the surface 651 by a pedestrian (acting subject) is varied depending on the direction in which the relative positional relation between the surface 611 or 621 (first surface) and the shoe sole 641 or the surface 651 (second surface) is changed by using a stripe texture or the like, thus being able to providing different bumpy feeling. Accordingly, different bumpy feeling can be presented depending on a heading direction of a pedestrian.

[Other Modifications and so Forth]

The present invention is not limited to the above-described embodiments. For example, the "first object", the "second object", the "base object", the "first contact object", the "second contact object", and so on may be composed of a magnetic body other than a magnetic sheet. The "first object", the "second object", the "base object", the "first contact object", the "second contact object", and so on may be electromagnet. Further, the above-described embodiments have shown the example in which a stripe texture or/and a checker texture magnetizes a magnetic body. However, a texture having another pattern may magnetize a magnetic body as long as bumpy feeling can be presented based on the above-described principles. Furthermore, the cutter component of the cutting plotter is replaced with the magnetization component and this cutting plotter is driven so as to magnetize a magnetic sheet in the first embodiment. However, instead of the cutting plotter, other devices in which a head can be moved in a planar direction such as a pen printer may be used. That is, a component such as a pen attached to a head of such a device may be replaced with the magnetization component and this device may be driven to magnetize a magnetic sheet.

DESCRIPTION OF REFERENCE NUMERALS 1 magnetization device
11 magnetization component
210, 220, 230, 240, 250, 260, 410, 510, 610 magnetic sheet
310, 310' base object
341, 342 sheet
401 touch panel
420 glove
430 stylus pen
500 computer mouse
600 floor
640 shoe
650 white cane

What is claimed is:

1. A force sense presenting object comprising:

a first object that includes a first surface, the first surface being magnetized with a first texture including an S-pole region and an N-pole region; and a second object that includes a second surface, the second surface being magnetized with a second texture including an S-pole region and an N-pole region, wherein an acting subject touches at least either one of the first object and the second object and performs an operation for changing a relative positional relation between the first surface and the second surface or/and an action for changing the relative positional relation between the first surface and the second surface while keeping the first surface and the second surface in contact with or close to each other, and thereby the acting subject perceives bumpiness, wherein the acting subject touches at least either one of the first object and the second object and performs an operation for changing a relative positional relation between the first surface and the second surface or/and an action for changing the relative positional relation between the first surface and the second surface while keeping the first surface and the second surface in contact with or close to each other, and thereby shearing stress received by the acting subject from at least one of the first object and the second object periodically changes, a pitch of the S-pole region and the N-pole region magnetized with the first texture is $p_B$, a pitch of the S-pole region and the N-pole region magnetized with the second texture is $p_A$, is a function, an attractive force area ratio $Ar_{(A,B)}$ between the first surface and the second surface is a function value $f(p_A, p_B)$ with respect to the pitch $p_A$ and $p_B$, a surface magnetic flux density of the first surface of the first object is $Bs_B$, a surface magnetic flux density of the second surface of the second object is $Bs_A$, g is a function, a holding force $H_{(A,B)}$ generated between the first object and the second object when the first surface and the second surface are in contact with or close to each other is a function value $g(Ar_{(A,B)}, Bs_{(A)}, Bs_{(B)})$ with respect to the attractive force area ratio $Ar_{(A,B)}$, the surface magnetic flux density $Bs_A$, and the surface magnetic flux density $Bs_B$, h is a function, the first texture and the second texture are magnetized so that the magnitude $V_{(A,B)}$ of bumpiness perceived by the acting subject is a function value $h(H_{(A,B)MAX})$ of a maximum value $H_{(A,B)MAX}$ of the holding force $H_{(A,B)}$ when the acting subject touches at least either one of the first object and the second object and performs the operation for changing the relative positional relation between the first surface and the second surface or/and the action for changing the relative positional relation between the first surface and the second surface while keeping the first surface and the second surface in contact with or close to each other.

2. The force sense presenting object according to claim 1, wherein a way of change in the shearing stress received by the acting subject from at least one of the first object and the second object varies depending on a direction in which a relative positional relation between the first surface and the second surface is changed.

3. The force sense presenting object according to claim 1 or 2, wherein the first texture and the second texture are textures in which regions magnetized to an S pole and regions magnetized to an N pole are periodically arranged in an alternate manner.

4. The force sense presenting object according to claim 1 or 2, wherein the first texture and the second texture are textures in which belt-like regions magnetized to the S pole and belt-like regions magnetized to the N pole are periodically arranged in an alternate manner.

5. The force sense presenting object according to claim 1 or 2, wherein the first texture and the second texture include a periodical nearly-checkered region magnetized to the S pole and a periodical nearly-checkered region magnetized to the N pole.

6. The force sense presenting object according to claim 1 or 2, wherein the first object can be fixed on a walking surface in a state that the first surface thereof faces upward, the second object is a member that can be worn or gripped by the acting subject in a state that the second surface thereof faces outside, and the acting subject wearing or gripping the second object walks on the first surface of the first object fixed on the walking surface while keeping the first surface and the second surface in contact with or close to each other and thus changes a relative positional relation between the first surface and the second surface, and thereby the acting subject perceives bumpiness.

7. A force sense presenting method of a force sense presenting object, wherein the force sense presenting object includes a first object that includes a first surface, the first surface being magnetized with a first texture including an S-pole region and an N-pole region, and a second object that includes a second surface, the second surface being magnetized with a second texture including an S-pole region and an N-pole region, and an acting subject touches at least either one of the first object and the second object and performs an operation for changing a relative positional relation between the first surface and the second surface or/and an action for changing the relative positional relation between the first surface and the second surface while keeping the first surface and the second surface in contact with or close to each other, and thereby the acting subject perceives bumpiness, wherein the acting subject touches at least either one of the first object and the second object and performs an operation for changing a relative positional relation between the first surface and the second surface or/and an action for changing the relative positional relation between the first surface and the second surface while keeping the first surface and the second surface in contact with or close to each other, and thereby shearing stress received by the acting subject from at least one of the first object and the second object periodically changes, a pitch of the S-pole region and the N-pole region magnetized with the first texture is $p_B$, a pitch of the S-pole region and the N-pole region magnetized with the second texture is $p_A$, f is a function, an attractive force area ratio $Ar_{(A,B)}$ between the first surface and the second surface is a function value $f(p_A,p_B)$ with respect to the pitch $p_A$ and $p_B$, a surface magnetic flux density of the first surface of the first object is $Bs_B$, a surface magnetic flux density of the second surface of the second object is $Bs_A$, g is a function, a holding force $H_{(A,B)}$ generated between the first object and the second object when the first surface and the second surface are in contact with or close to each other is a function value $g(Ar_{(A,B)},Bs_{(A)},Bs_{(B)})$ with respect to the attractive force area ratio $Ar_{(A,B)}$, the surface magnetic flux density $Bs_A$, and the surface magnetic flux density $Bs_B$, h is a function, the first texture and the second texture are magnetized so that the magnitude $V_{(A,B)}$ of bumpiness perceived by the acting subject is a function value $h(H_{(A,B)MAX})$ of a maximum value $H_{(A,B)MAX}$ of the holding force $H_{(A,B)}$ when the acting subject touches at least either one of the first object and the second object and performs the operation for changing the relative positional relation between the first surface and the second surface or/and the action for changing the relative positional relation between the first surface and the second surface while keeping the first surface and the second surface in contact with or close to each other.

\* \* \* \* \*